July 25, 1950
J. L. BARNHILL
2,516,445
BALE TYING MECHANISM
Filed March 13, 1946
12 Sheets-Sheet 5
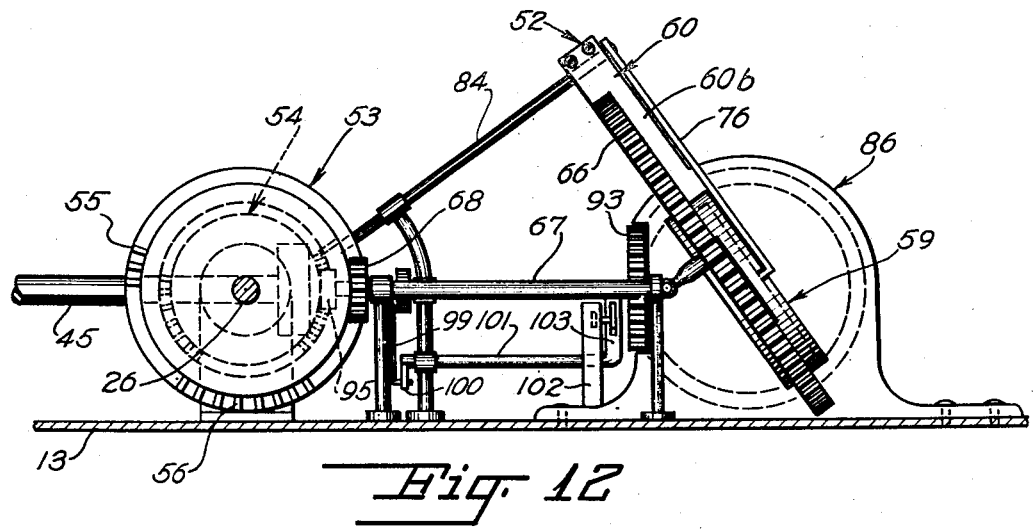
Fig. 12
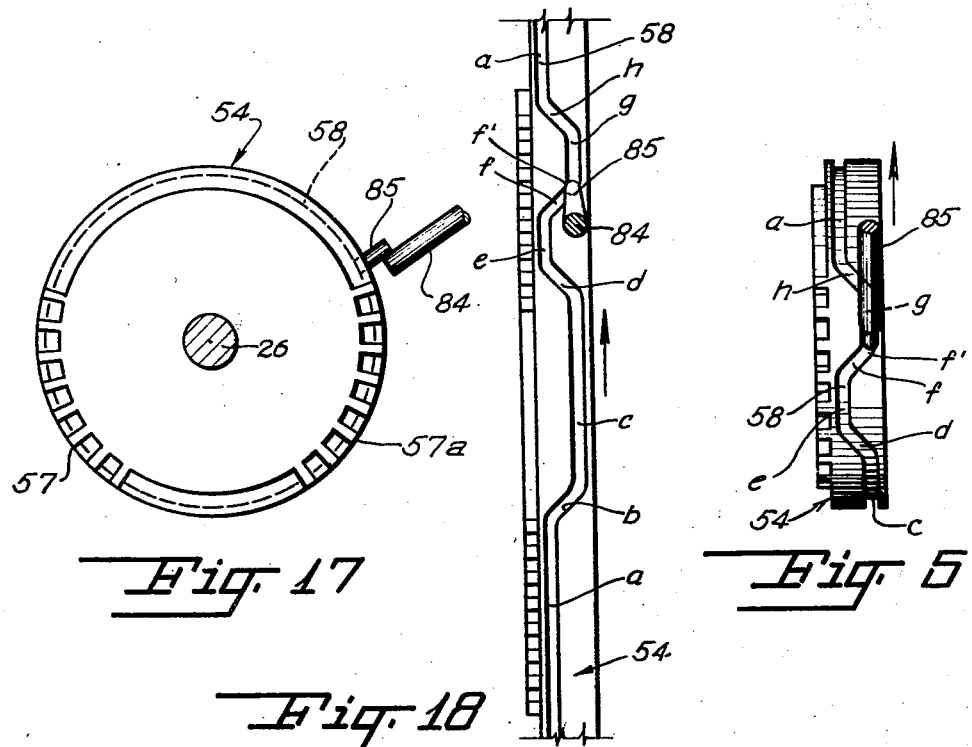
Fig. 17
Fig. 18
Fig. 5
Inventor
Jarrell L. Barnhill
By Wilfred E. Lawson
Attorney

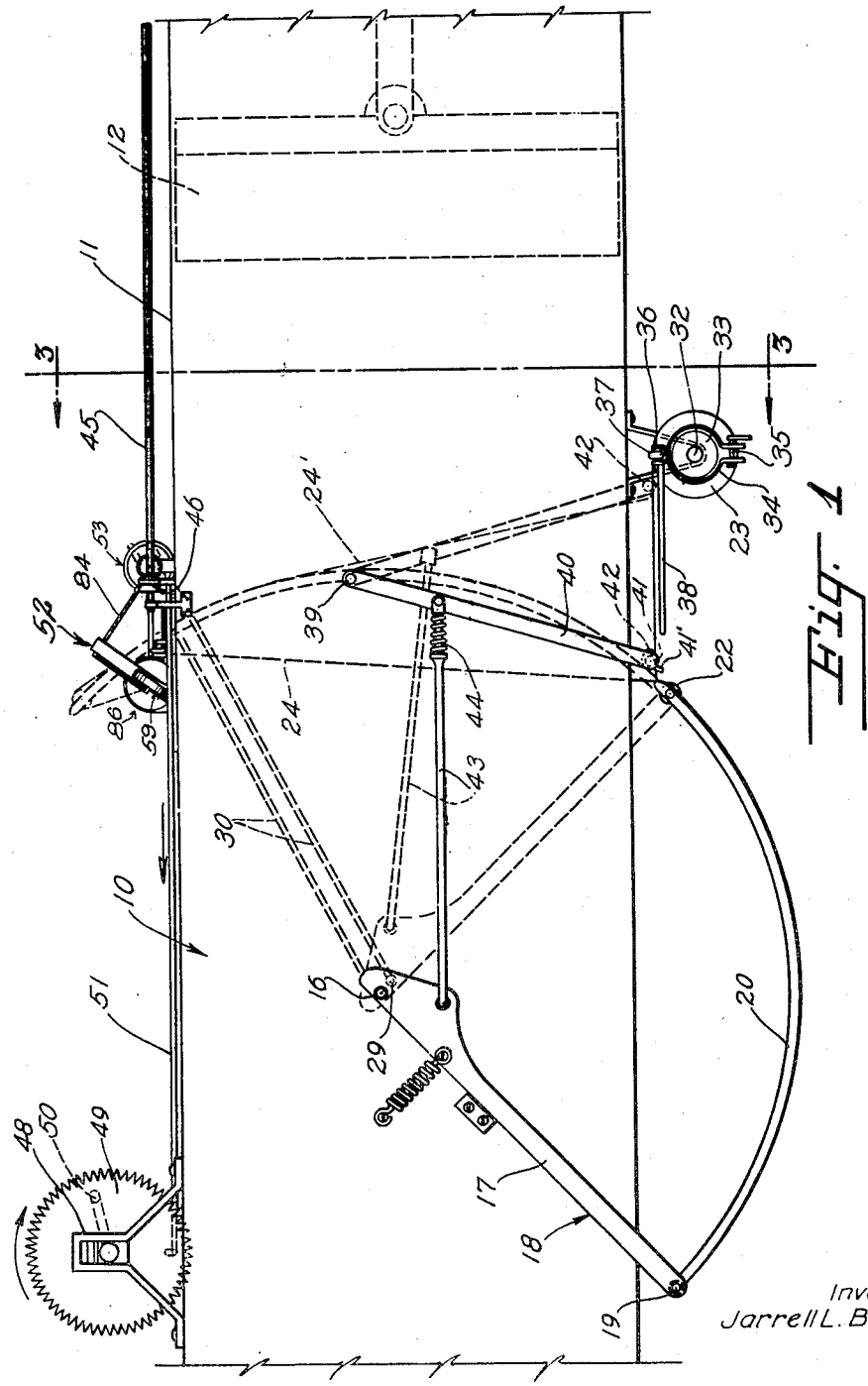

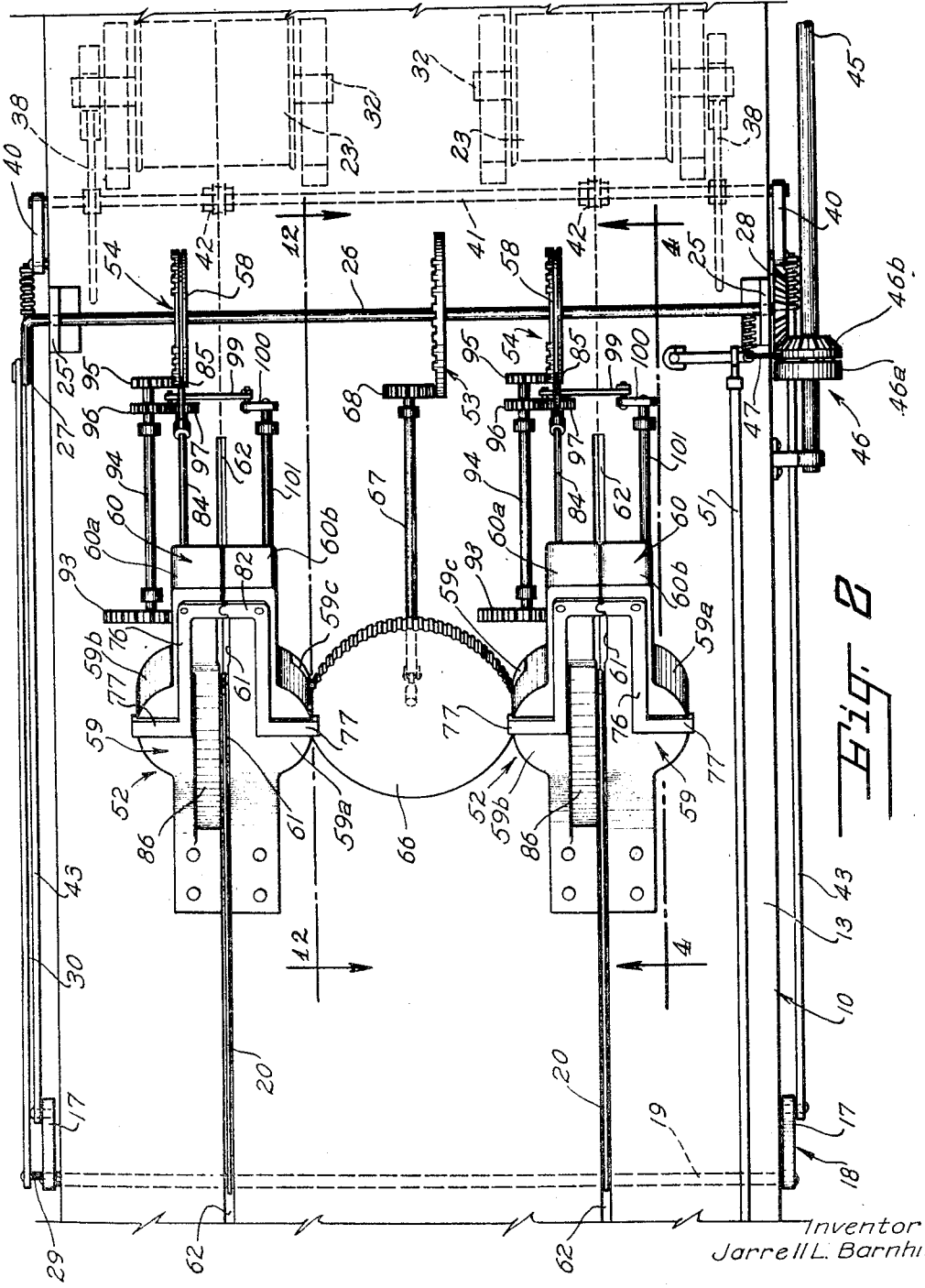

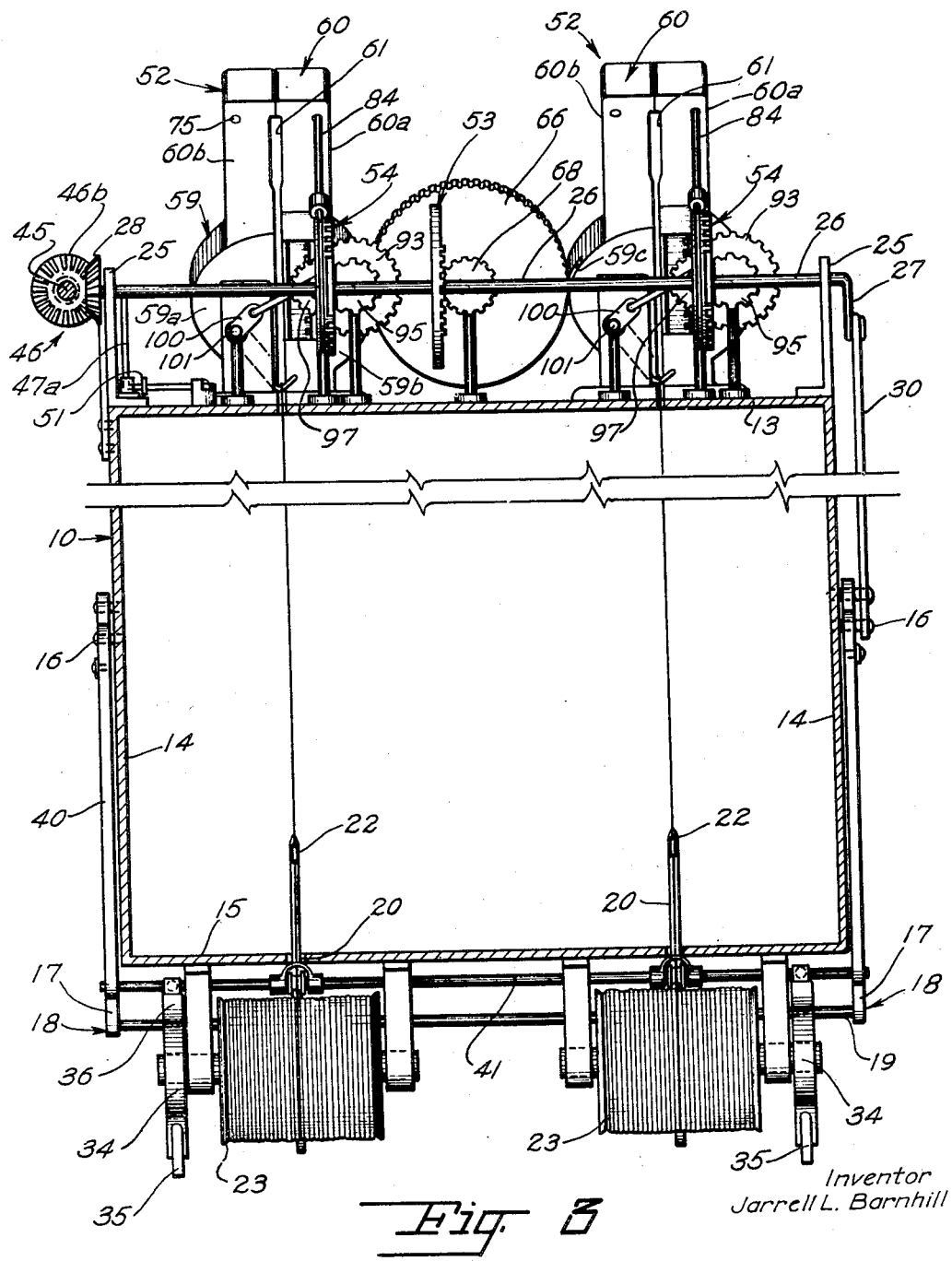

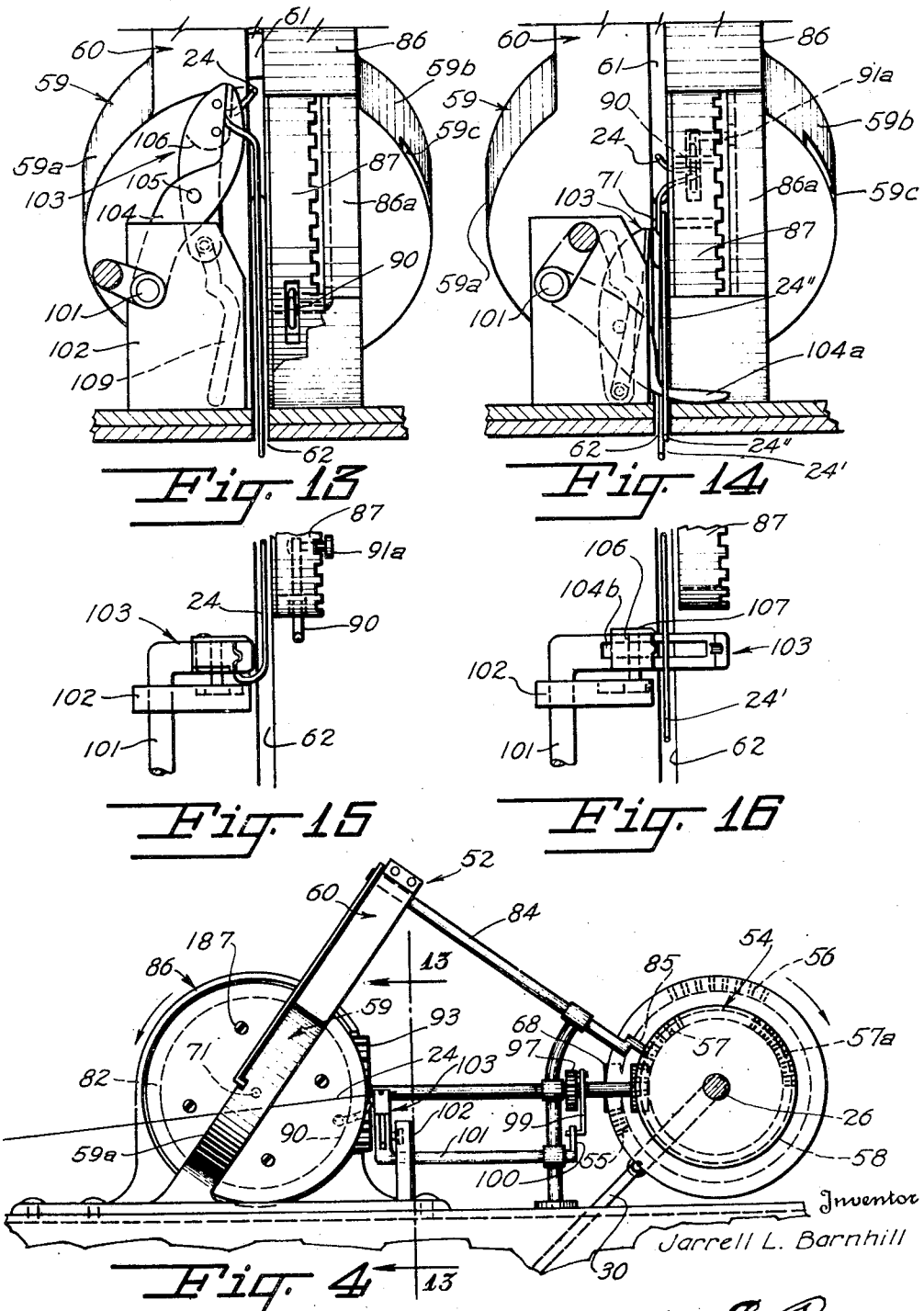

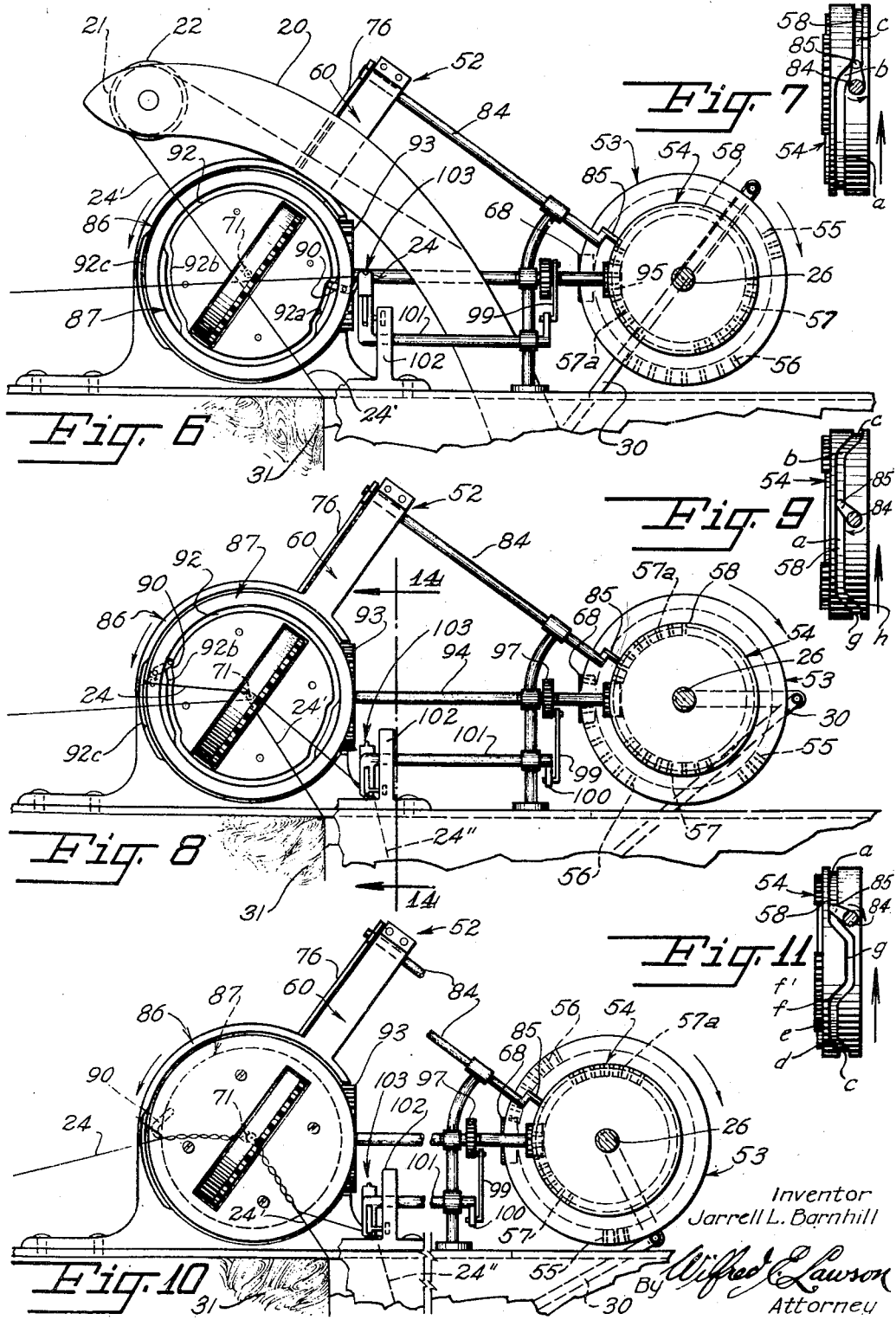

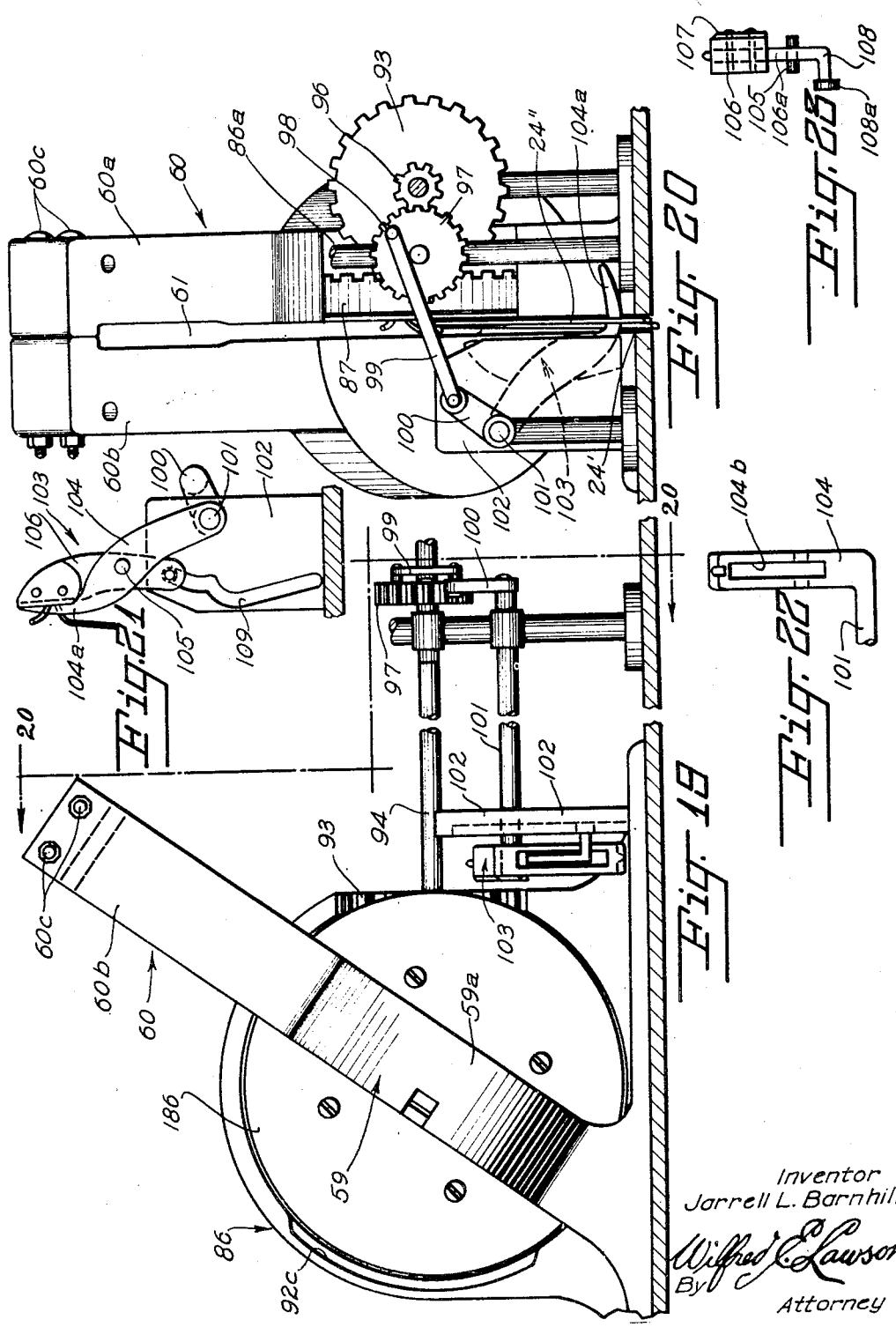

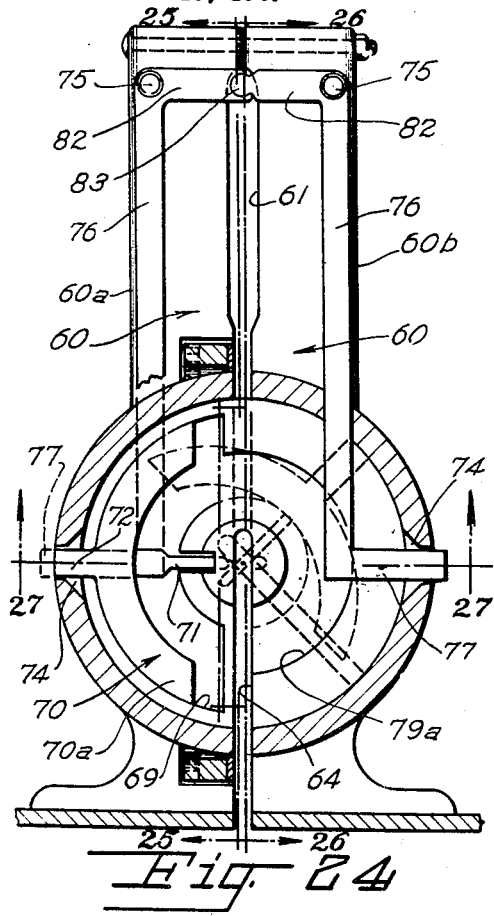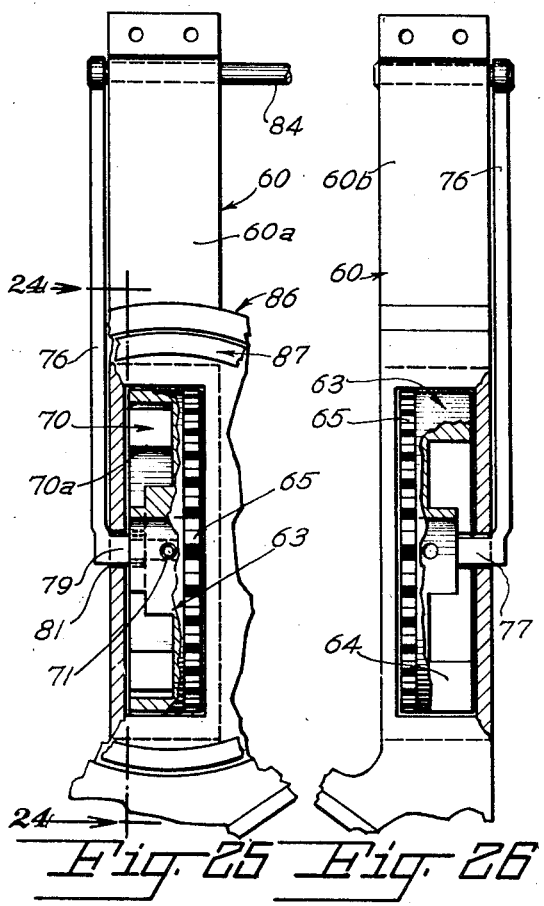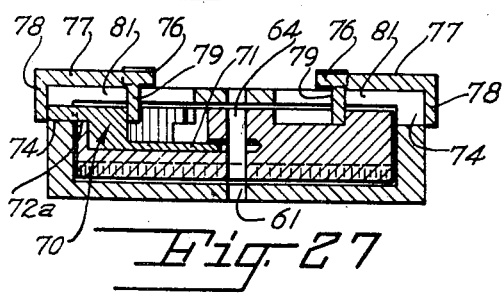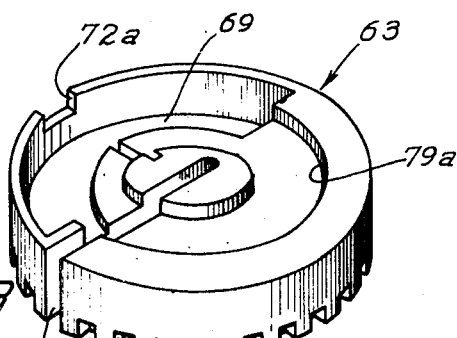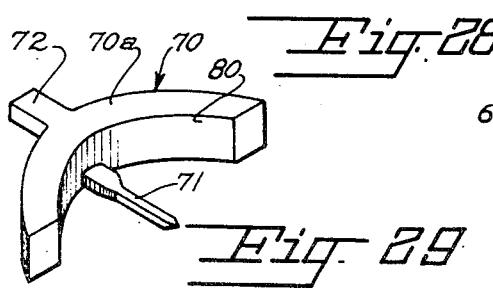

July 25, 1950  J. L. BARNHILL  2,516,445
BALE TYING MECHANISM
Filed March 13, 1946  12 Sheets-Sheet 9
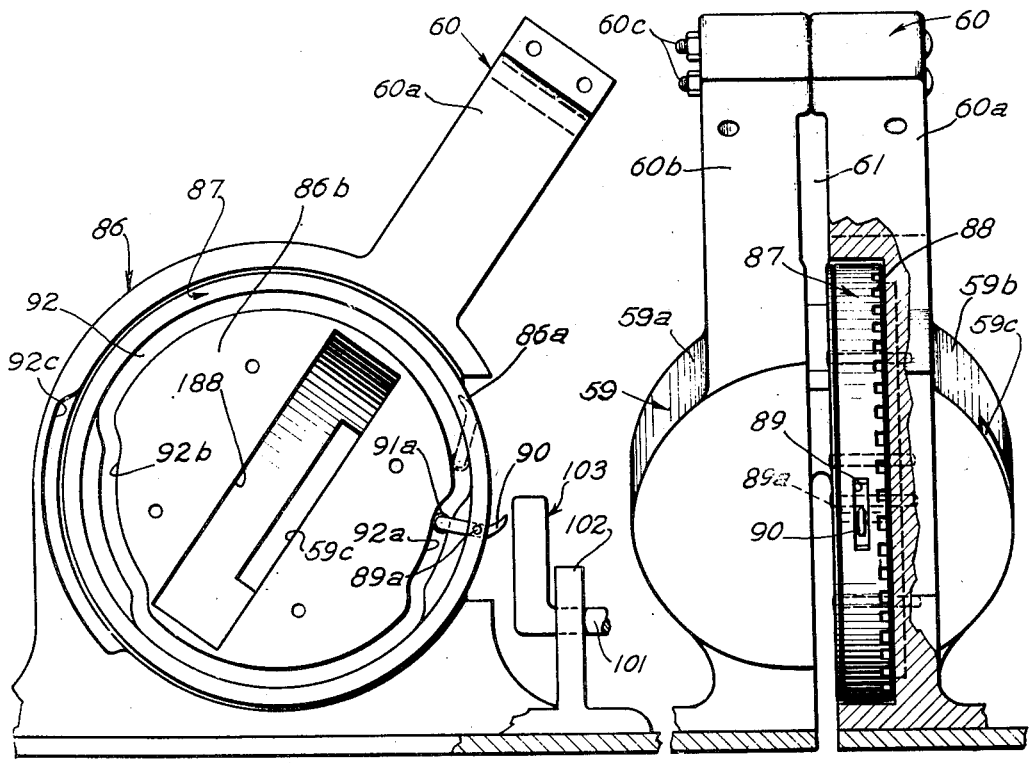
Fig. 30  Fig. 31
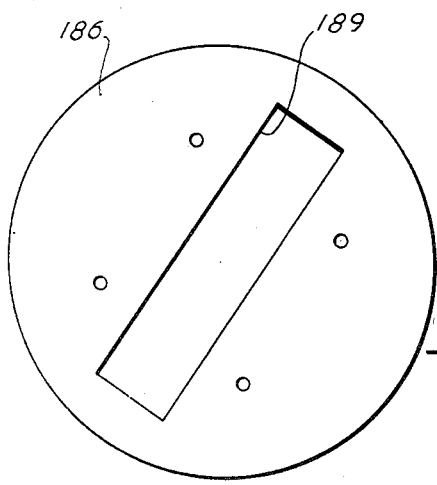
Fig. 32  Fig. 33
Fig. 34
Inventor
Jarrell L. Barnhill
By Wilfred E. Lawson
Attorney

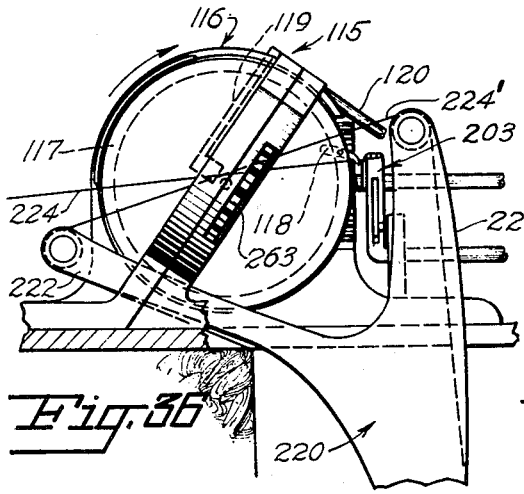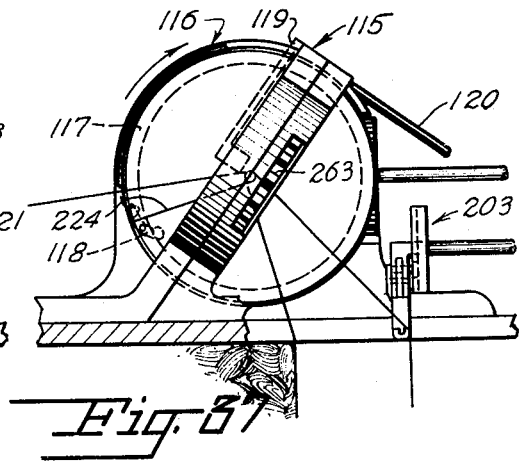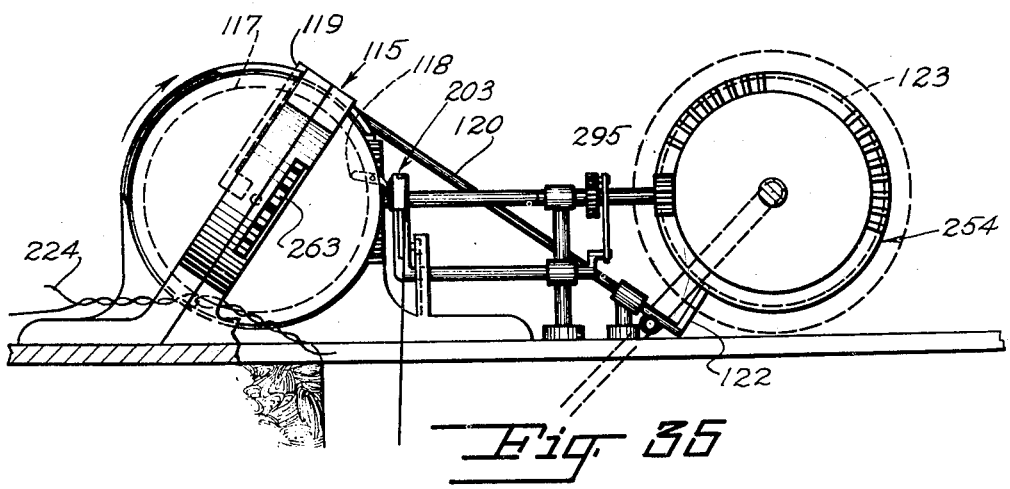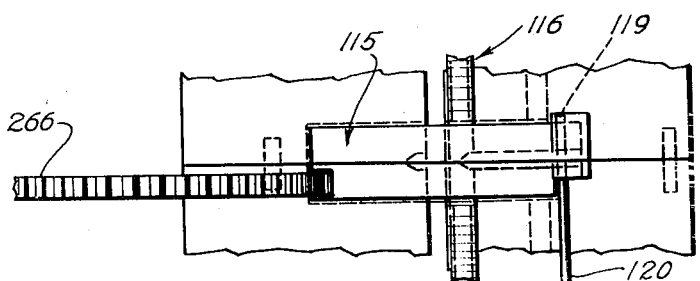

July 25, 1950  J. L. BARNHILL  2,516,445
BALE TYING MECHANISM
Filed March 13, 1946  12 Sheets-Sheet 11
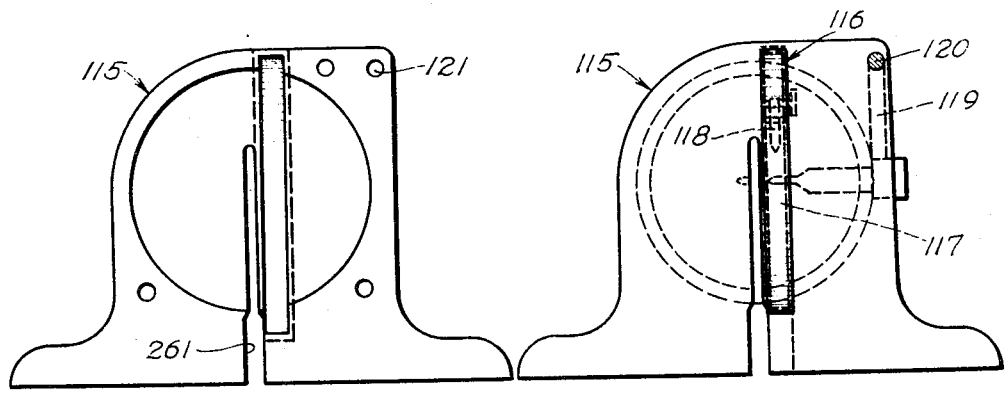
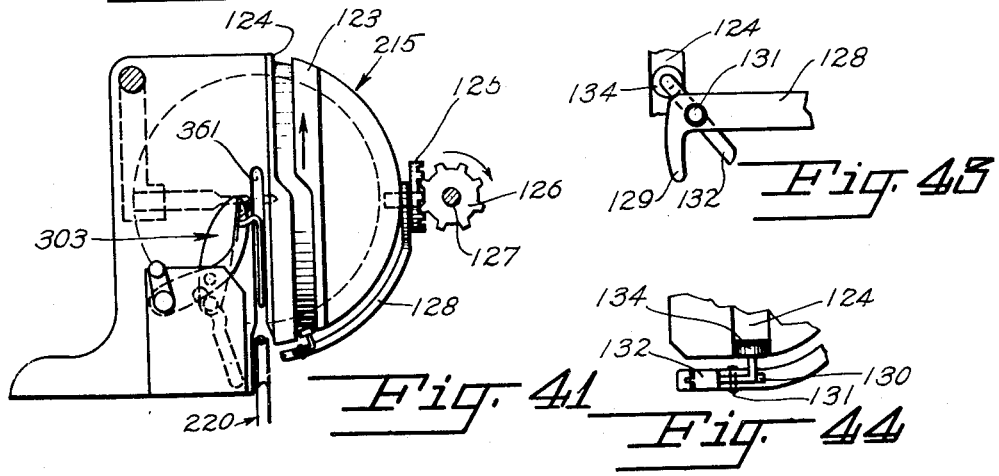
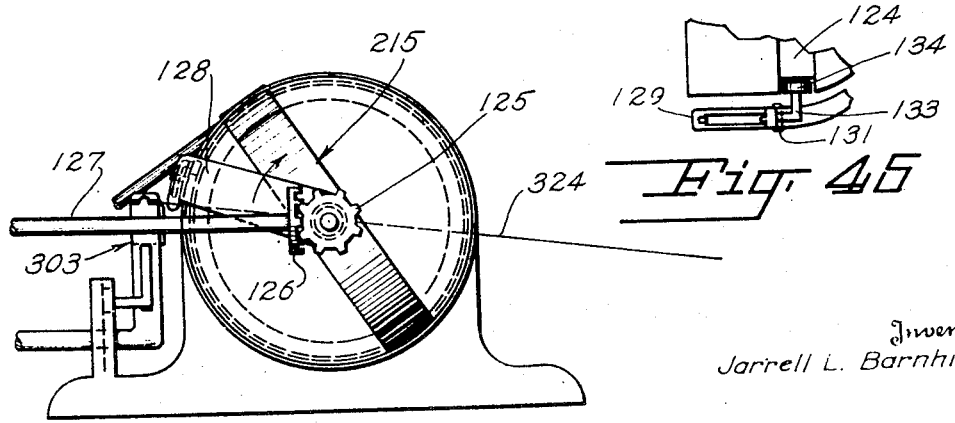
Inventor
Jarrell L. Barnhill
By Wilfred E. Lawson
Attorney

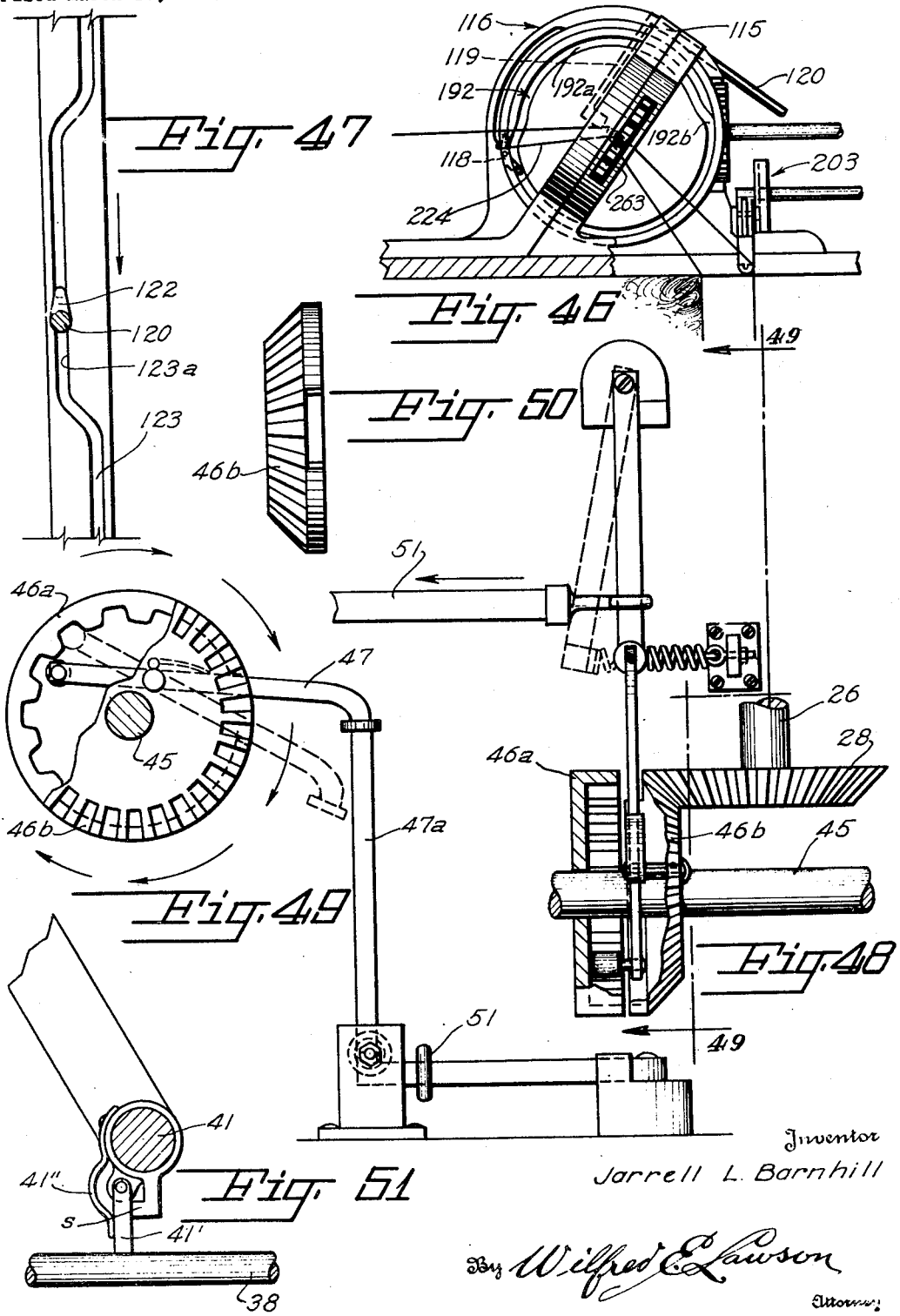

Patented July 25, 1950

2,516,445

UNITED STATES PATENT OFFICE 2,516,445

BALE TYING MECHANISM

Jarrell L. Barnhill, Norman, Okla.

Application March 13, 1946, Serial No. 654,064

21 Claims. (Cl. 100—20)

This invention relates generally to the class of baling presses and pertains particularly to a hay baling and tying mechanism.

A particular object of the present invention is to provide an apparatus to mechanically and entirely automatically form a bale and place and tie or secure wires around the same, thereby eliminating the necessity of employing two operators for performing these jobs, as is required upon balers of the type at present in use.

Another object of the invention is to provide an automatic bale tier which forms a conventional twist knot such as is at present formed by hand in connection with balers, and is designed to continuously feed the tying wire from the completion of one bale to the beginning of the next bale so that the operation of baling, tying and discharging the completed bales is maintained continuous without attention on the part of an attendant of the machine, so long as the machine is continued in operation and material is fed into the press.

Still another object of the invention is to provide a novel wire twisting and cutting mechanism for securing a wire around a completed bale, together with novel means for automatically holding that end of the wire, after the wire has been twisted and cut, which leads from a spool of wire, whereby the wire is automatically placed around the new bale as the same is formed in the press.

Still another object of the invention is to provide in a hay baling and tying mechanism, a twister mechanism and wire end holding mechanism or gripper which are so constructed and arranged that the wire is automatically placed in position in the twister as the bale is formed and as the wire is drawn around one end and one side of the bale.

A still further object of the invention is to provide a novel rotatable wire twister having a slot in which are laid the ends of the wire which are joined to form a twisted tying knot, with novel means for confining the wires in said slot and for releasing the wires after the twist or knot has been formed.

Another object of the invention is to provide in a hay bale tier a novel mechanism for taking an end of a wire from a gripping holder and looping the same around a twist pin preparatory to performing the end to end rotation of such pin whereby to effect the formation of the desired tying loop or twist between such end and another portion of the wire and for subsequently severing the said other portion of the wire from the spool and raising and holding the severed end in preparation for the pressing of a new bale.

Still another object of the invention is to provide, in a hay baler and tier of the type employing oscillatable arcuate needles for drawing a portion of a tie wire from a spool across an end of the bale into position relative to the secured free end of the wire, a mechanism operating automatically to brake the rotary motion of the wire spool following the retraction of the needles so that the wire will not unreel at a too rapid rate when the press plunger operates for the formation of a new bale.

Other objects and advantages of the invention will become apparent as the description of the same proceeds and the invention will be best understood from a consideration of the following detailed description, taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Figure 1 is a conventional illustration inside elevation of a portion of a baling press such, for example, as a hay baler, showing the application thereto of the wire applying and tying mechanism of the present invention.

Figure 2 is a view in top plan of the press structure showing in top plan a part of the tying mechanism of the present invention.

Figure 3 is a vertical transverse section taken substantially on the line 3—3 of Figure 1 looking toward the rear of the press structure.

Figure 4 is a sectional view taken substantially on the line 4—4 of Figure 2 through the main operating shaft for the mechanism and showing a portion of the mechanism in side elevation looking in the direction of the arrows.

Figure 5 is a diagrammatic view of a portion of the cam track controlling the operation of the actuator arm in the position which it occupies when the parts are in the relative positions shown in Figure 4.

Figure 6 is a view corresponding to Figure 4 showing the fully raised position of the point of a needle, the cover housing for the looper and twister gears being removed to show the looper finger cam track and the relative positions of the looper finger and the wire gripper.

Figure 7 is a diagrammatic view of the portion of the actuator arm controlling cam track in the position it has assumed when the parts are as shown in Figure 6.

Figure 8 is a view corresponding to Figure 6, illustrating the position to which the looper gear and finger are turned preparatory to twisting the knot and the needle actuated portion of the wire drawn back across the opened gripper.

Figure 9 is a diagrammatic view of the portion of the actuator arm controlling cam in the position which it assumes when the parts are as shown in Figure 8.

Figure 10 is a view corresponding to Figure 8 showing the twisted condition of the joined portions of the tie wire preparatory to the release of the knot or twist by the divider pin, the looper finger cam track cover plate being in position in this figure.

Figure 11 is a diagrammatic view of the actuator arm controlling cam track showing the position it assumes when the parts are in the positions shown in Figure 10.

Figure 12 is a sectional view taken substantially on the line 12—12 of Figure 2 through the transverse operating shaft and looking, in the direction of the arrows, toward the center of the mechanism.

Figure 13 is a sectional view taken substantially on the line 13—13 of Figure 4 showing the wire gripper in raised position preparatory to the starting of the baling operation.

Figure 14 is a sectional view taken substantially on the line 14—14 of Figure 8 showing the twister gear with the slot directed upwardly and the wire gripper open and with a portion of the wire laid therein by the lowered needle.

Figure 15 is a view looking down upon the wire gripper when in its raised position as shown in Figure 13, and showing a portion of the looper gear with the looper finger.

Figure 16 is a view looking down upon the wire gripper when in its open position as shown in Figure 14 after the end of the wire has been released to the looper finger and with a new portion of wire laid in ready to be gripped by the closing of the gripper.

Figure 17 is a view of the toothed side of an auxiliary gear in the periphery of which is formed the cam groove which controls the actuation of the actuator arms.

Figure 18 is a diagrammatic view illustrating in one plane the cam groove formed around the periphery of the auxiliary gear shown in Figure 17.

Figure 19 is a view in side elevation and on an enlarged scale of the housing for the looper and twister gears together with the mechanism for transmitting operating power to the driving gear for the looper gear and the wire gripper, the actuator arms being removed.

Figure 20 is a sectional view taken substantially on the line 20—20 of Figure 19.

Figure 21 is a view in elevation of the wire gripper and the control cam track therefor as seen from the rear side, the gripper being in elevated and closed or wire gripping position.

Figure 22 is a view looking at the wire engaging jaw of the gripper arm.

Figure 23 is a view of the cam actuated and knife carrying jaw portion of the gripper.

Figure 24 is a view looking at the rear side of a looper gear and twister gear unit with a portion of the housing for each gear cut away substantially on the line 24—24 of Figure 25 and showing the twister gear and divider in elevation in the housing.

Figure 25 is a sectional view taken substantially on the line 25—25 of Figure 24, looking in the direction of the arrows.

Figure 26 is a sectional view taken substantially on the line 26—26 of Figure 24, looking in the direction of the arrows.

Figure 27 is a transverse sectional view taken substantially on the line 27—27 of Figure 24, looking in the direction of the arrows.

Figure 28 is a view in perspective of the twister gear showing the side thereof in which the divider pin is mounted.

Figure 29 is a view in perspective of the divider.

Figure 30 is a view in elevation of that side of the two part housing for a twister gear and looper gear, the twister gear being removed but showing the looper gear in position and showing the looper finger actuating cam track in a wall of the housing.

Figure 31 is a view in elevation of the forward side of the two part looper gear and twister gear housing, a portion of the part housing the looper gear being broken away to show the looper gear and finger in elevation.

Figure 32 is a detail view illustrating the mounting for the looper finger in the looper gear.

Figure 33 is another detail view of the looper finger mounting in the looper gear, looking toward the periphery of the gear.

Figure 34 is a view in plan of the looper gear cover plate.

Figure 35 illustrates a slight modification of the mechanism in which the wire is introduced into the downwardly directed slot of the twister gear by a two-horned needle whereby the first half revolution operation of the twister gear is eliminated.

Figure 36 illustrates the manner in which the wire is introduced by the two-horned needle into the downwardly directed slot of the twister gear.

Figure 37 illustrates the manner in which the looper gear is rotated after a portion of the wire is introduced into the twister gear slot, the looper gear rotation being in a direction opposite from the first described embodiment of the invention.

Figure 38 illustrates the manner in which the looper gear housing is divided and showing the use of a single actuator arm shaft.

Figure 39 illustrates one-half of the housing structure shown in Figure 38, looking into the recess which receives a portion of the twister gear.

Figure 40 is a view looking at the modified structure shown in Figure 38, from the forward side.

Figure 41 illustrates still another embodiment of the invention showing another method of actuating the looper held end of the wire around the divider pin, the figure showing the modified construction as seen when looking rearwardly of the machine.

Figure 42 is a view in side elevation of the modified construction shown in Figure 41 looking across the press housing slot toward the wire gripper.

Figure 43 is a detail view illustrating the wire gripping looper fingers, in front elevation.

Figure 44 is a view looking toward the edges of the fingers shown in Figure 43, as seen when closed.

Figure 45 is a view corresponding to Figure 44 and showing the fingers separated.

Figure 46 is a view corresponding to Figure 37 but showing the looper ring gear cover plate removed to illustrate the grasping finger actuating cam tracks.

Figure 47 is a diagrammatic view illustrating in one plane the cam groove formed around the periphery of the auxiliary gear illustrated in Figure 35.

Figure 48 is a view in top plan and on an enlarged scale of the single revolution clutch mechanism.

Figure 49 is a sectional view taken substantially on the line 49—49 of Figure 48.

Figure 50 is an edge view of a gear of the clutch mechanism.

Figure 51 is a detail view on an enlarged scale of a portion of the wire reel brake control apparatus.

Referring now more particularly to the drawings the reference character 10 generally designates the press box of a hay baling machine through the top or side of which is formed in the part designated 11, a suitable opening through which hay may be introduced into the box, to be compressed in the customary well-known manner by the continuously reciprocating plunger 12.

While the present invention has been illustrated mounted upon the top of the baler, it is to be understood that it is designed for and may be used upon pick-up balers which have the opening in the side, with a cutting knife on the plunger.

No details of the driving mechanism for the plunger or other parts of the press box structure are illustrated since such mechanism is standard on hay bale presses and well-known to those familiar with the art and it is, therefore, believed that a description and illustration of such mechanism is not required.

The bale press box has the usual top wall 13, side walls 14 and under or bottom wall 15 and the side walls 14 are provided with the bearings 16 which are axially aligned transversely of the press box, and upon each of which is pivotally mounted an end of a side arm 17 of a substantially U-shaped needle carrying yoke 18, the intermediate portion 19 of which extends across the underside of the press box.

Attached to the portion 19 are arcuate wire feed needles 20, the concave side of each needle being directed upwardly as shown. The two wire feed needles 20 are disposed upon opposite sides of the vertical plane of the longitudinal center of the press box and inwardly from the side walls as shown in Figures 2 and 3, and when the needles are in retracted or inoperative position the free ends or points are below the plane of the top surface of the bottom wall 15 as illustrated in Figure 1. Such bottom wall, if not of slatted construction, is provided with suitable openings or slots in the planes of vertical movement of the points of the needles to allow the needle points to be swung in arcuate paths upwardly through the press box across the forward end of a completed bale.

Each needle at its free end is provided with an eye 21 through which the baling wire passes and upon the side of the wire away from the needle point, there is pivotally supported within the eye, the needle roller 22, Figure 6, across which the baling wire is drawn when the needle operates to carry the wire across the front end of the completed bale, in the manner hereinafter described.

Any desired number of needles may be provided for carrying a corresponding number of wires around a formed bale and in the present illustration of the invention two needles are shown, with each of which is associated a reel of wire 23, which is suitably rotatably supported upon the underside of the press box forwardly of the free end of the needle. As shown in Figure 1, at the start of the baling operation with the present mechanism or at the completion of the tying of a completed bale, the starting end portion of the wire, designated 24, extends rearwardly from the reel, through the adjacent needle eye 21 and upwardly through the press box and through the top wall thereof and is secured to the hereinafter described wire holder or gripper.

Since the mechanism may be made to handle one wire or a number of wires even though the units or parts are shown in duplicate for the handling of two wires, the description will, in the main, be given in the singular as applied to one divider and twister mechanism, for the sake of clarity.

Supported in suitable bearings 25 at opposite sides of the press box, at the top and substantially directly above the points of the needles when the latter are in retracted or inoperative position, is the main shaft 26 which extends transversely of the top of the machine and which at one end is formed to provide the crank 27 while at its opposite end it carries a stop clutch gear 28.

At the side of the machine upon which the crank 27 is located the needle actuating arm 17 carries a crank pin 29 which is disposed relatively close to the bearing 16. Connected with this crank pin 29 is one end of a connecting rod 30 which, at its other end, is pivotally coupled with the crank 27 of the main shaft 26. Thus when rotary motion is given to the shaft 26, in the proper direction, the needles 20 will be moved around the bearings 16 so as to either advance through the press box between a formed hay bale 31, Figures 6, 8 and 10, and the plunger 12 or to move backwardly to retracted or inoperative position, for the purpose hereinafter described. During such movement each needle either carries a portion of the binding wire from the adjacent reel 23 upwardly across the forward end of the completed bale or pulls down upon and tightens a new starting end portion 24', of the wire, Figure 10, preparatory to the formation of a new bale.

Since at the beginning of the formation of a bale the end of the starting portion 24 of each wire is held or secured, in the manner hereinafter described, above the top of the press box, such portion of the wire will extend very nearly or actually straight downwardly through the press box to the retracted end of the needle to which it is connected so as to be in the path of movement of hay which is introduced into the press box in advance of the plunger 12. Thus when the plunger advances such hay will be compressed against the wire or wires and the wire will be payed out from the reel and moved rearwardly in the press box. As the wire is payed out from the reel it will move across the needle eye roller and when the bale of desired size is formed the wire will then pass rearwardly from the reel along the underside of the formed bale and up across the rear end of the bale and then forwardly along the top of the bale to the point where its end is attached. This forwardly extending part of the wire, the end of which is secured as stated, is shown in Figures 4, 6, 8 and 10. Consequently when the needle swings upwardly the wire must be payed out freely from the reel and after the upwardly drawn portion of the wire is knotted with the secured end, and the wire is cut, in the manner hereinafter described.

the new end will be held, as also hereinafter described, and the needle in returning to its retracted position pulls the wire back from the secured end straight through the press box. In this retracting action of the needle or reverse movement after the wire has been carried up for the formation of a knot, some slack will form in the wire and it is necessary that this slack be taken up quickly so as to draw the wire tight to facilitate the proper formation of the knot or twist which is hereinafter more fully described. Accordingly there is provided an automatic wire reel braking mechanism which is as follows.

Braking mechanism

Connected with each wire reel 23 or with the shaft upon which the reel may be mounted for turning, such, for example, as the shaft 32, is a brake drum 33 and encircling the drum is the two-part brake shoe 34 the parts of which are loosely and adjustably coupled together upon one side of the drum as indicated at 35 in a suitable manner to facilitate tightening the shoes on the drum when desired, while at the opposite side the ends of the two parts are disposed in crossed relation and spaced to provide the bearing fingers 36 between which is oscillatably supported a cam 37.

Connected with the braking cam 37, is a brake arm 38 which extends rearwardly of the structure or toward the needles.

Pivotally attached as at 39 upon the outer side of each side wall 14 of the press box, is the downwardly extending tension arm 40 and these arms are connected at their lower ends by the transverse bar 41 which passes beneath the press box. Suitable rollers 42 are carried by this transverse bar, across the undersides of which the wires from the reels 23 pass to the eyes of the adjacent needles.

One or both of the tension arms 40 is operatively coupled with the adjacent needle arm 17 by the coupling rod 43, suitable spring shock absorbing means 44 forming a part of the connecting rod structure to absorb shocks incident to the actuation of the tensioning arms with the needles. This spring assures that the wire will not be broken by the tension arm rollers 42 when the tension arm moves to normal position because the connection between the connecting rod 43 and the tension arm is spring loaded.

In the vertical plane of each brake arm 38, as shown in Figure 51, the transverse bar 41 carries a spring loaded cam finger 41' which is vertically oscillatable and which is normally urged to swing downwardly from the bar 41 by the spring 41''. This downward swinging of the cam finger 41' under the action of the spring 41'', is limited by the stop s so that the cam finger when engaged against the stop will be directed downwardly and upon the rearward swinging of the bar 41 this finger will engage and move along the top of the brake arm 38 and oscillate the brake arm downwardly so as to tighten the brake and thus hold the adjacent wire reel against rotation. Thus when the needle is returning to its starting position the slack which will be formed in the wire between the reel and the needle will be taken up by the forwardly swinging transverse bar 41 and the reel will be prevented from paying out wire.

The overrunning of the wire reels, when the needle is moving upwardly and taking wire from the reels is prevented by adjusting the tightening means 35 so that a slight drag will be maintained at all times upon the reel. During this time that the needles are rising and the arms 40 are swinging forwardly, the spring loaded cam fingers 41', each of which is carried along the top side of and bears on a brake arm 38, will be swung back against the tension of the adjacent springs 41'' so that no down thrust will be applied to the underlying brake arm. In addition to the fact that the overrunning of the reel is prevented in the manner described, it will be seen that the wire will be drawn tightly through the press box across the adjacent end of the formed bale of material.

Trip control mechanism

The necessary turning or rocking motion is transmitted to the main shaft 26 through the medium of the power delivering shaft 45 which is operated by any suitable source of power and which carries a stop clutch and gear unit, generally designated 46, which is of standard well-known construction. Since the stop clutch is a standard and well-known construction it is not deemed necessary to give a detailed illustration and description of the same except to point out that such clutch structure comprises an internal toothed clutch plate 46a which is secured to the power shaft 45 and, adjacent to the open side of the clutch plate 46a is the gear 46b which is mounted for free rotation on the shaft 45 and is constantly in mesh with the gear 28. The gear 46b has pivotally mounted thereon upon the side adjacent to the clutch plate, a clutch arm 47 which is suitably spring biased so that when it is free to oscillate one end will move into clutch connection with the plate 46a and thus lock the plate and gear 46b together for simultaneous rotation. The other end of the clutch arm 47 extends beyond the periphery of the gear and plate and normally engages an oscillatable trip pawl 47a which is suitably spring biased to have one end constantly urged to a position where it will be engaged by the free outer end of the arm 47 so that the opposite end of the arm will be kept normally out of operative connection with the clutch plate 46a.

Rotatably supported upon the top of the press box, by suitable bearings 48, is a measuring wheel 49 which carries a trip arm 50. This wheel structure is also of a well-known type and it has a portion of the periphery extended into the press box to be contacted by the bale as the latter is formed, to be rotated by the bale so that after a predetermined degree of rotation the trip arm 50 will be brought into engagement with the trip rod 51 to effect movement of the latter.

The trip rod is operatively coupled at its other end with the trip pawl 47a and actuates the pawl to shift it out of engagement with the trip arm 47 to permit the arm to be swung into clutching engagement with the clutch plate 46a. As previously stated the pawl 47a is spring biased to move back into arm stopping position which it does immediately after the trip rod has been shifted so that upon one revolution of the clutch plate the free end of the clutch arm will engage the pawl and the arm will be disengaged from the clutch plate thus stopping the transmission of rotary motion to the shaft 26.

Main shaft gears

The shaft 26, in a structure such as that here illustrated where there are employed two divider and looper units, each of which units is designated, as a whole, 52, carries a main timing gear 53 and two auxiliary timing gears 54.

The main timing gear 53 is of interrupted tooth form, having a small toothed segment 55 and a larger toothed segment 56, as shown in Figure 12, the function of which segments will be hereinafter specifically stated.

The auxiliary gear 54 has, in addition to the two tooth groups 57 and 57a, a peripherial cam track 58, the function of which will be hereinafter described.

*The divider and twister units*

The divider and looper units are positioned rearwardly of the auxiliary gears 54 and each unit, which is in two parts, includes a two-part circular housing 59 which lies in an inclined plane with respect to the top of the press box, extending upwardly and forwardly therefrom. From the upper part of this circular housing there projects a plate 60 which is also divided longitudinally into the two parts designated 60a and 60b.

The two parts of the circular housing 59, which are designated 59a and 59b, and the plate parts 60a and 60b, are spaced to provide a slot 61 which coincides with and is in the vertical plane of a slot 62 extending through and longitudinally of the top of the press box. The slot 61 passes through the radial center of the circular housing as shown.

The plate 60 is so positioned with respect to the arcuate path of travel of the point of the adjacent needle that when such needle is moved upwardly it will pass through the upper end of the slot 61 which extends nearly to the upper end of the plate 60 and will move over the top of and rearwardly past the upper part of the circular housing and the radial center thereof so as to carry a portion of the binding wire into the central part of the housing.

As it is clearly shown in a number of the figures of the drawings as, for example, Figures 20 and 24, the upper ends of the parts 60a and 60b of the plate 60 are joined together and are secured to form a solid unit, by the transverse securing members, here shown as bolts, 60c.

Supported within the circular housing 59 for free rotation therein is the divider and twister disc or wheel 63 shown in perspective in Figure 28, which has a radial slot opening through and extending from the periphery, slightly beyond its radial center, such slot being designated 64.

The periphery of the disc 63 is provided with gear teeth 65 and rotatably mounted between the two divider discs and meshing with the teeth 65 through suitable openings 59c, is the twister drive gear 66 with which is connected the articulated shaft 67 which carries the gear pinion 68 which is adapted for driving connection with the teeth of the main timing gear 53, see Figure 2. It will be seen from the foregoing that when rotary movement is imparted to the twister disc the slot 64 of the twister disc will have two positions where it will coincide with the slot 61. When in the first position, the slot 64 will open downwardly and rearwardly and when in the second position it will open upwardly and forwardly.

The twister disc has one side face, which is the upper face of the disc when it is in the housing 59, provided with the semicircular recess 69 which receives the major portion of a radially shiftable divider unit which is generally designated 70. As shown in Figure 29 this divider unit comprises a substantially semicircular body 70a from the radial center of which extends, upon the concave side, the tapered divider pin 71 which, as shown in Figure 27, is adapted, when the unit 70 is shifted radially inwardly, to have its point extended across the inner end of the slot 64, which slot extends, at its inner end, slightly beyond the axial center of the twister disc. When the unit 70 is fully retracted the end of the pin 70 will be completely withdrawn from across the slot 64 as it is shown in Figure 27.

The arcuate portion 70a of the unit 70 has extending radially from the convex side, the locking arm 72 which rides in a notch 72a in the outer portion of the twister disc, as shown in Figure 27, the notch being particularly clearly shown in Figure 28.

At diametrically opposite sides of the twister disc housing are formed keeper slots 74 into which the outer end of the lock arm 72 is designed to be intermittently and successively engaged.

Supported upon the plate 60 and pivotally coupled thereto at the spaced points 75 are divider pin actuator arms 76 which extend in spaced parallel relation upon opposite sides of the slot 61 across the top side of the disc housing where they terminate in the oppositely outwardly directed extensions 77 which are radial with respect to the disc. Each of these extensions carries the spaced actuator fingers 78 and 79, the finger 78 being arranged to enter the adjacent slot 74 when the free end of the arm is shifted inwardly, to engage the end of the adjacent lock arm 72 and move the pin 71 inwardly to a position across the slot 64 where, when the disc is turned, the end of the lock arm will slide out of engagement with the finger 78 and into engagement with the inner side of the encircling portion of the disc housing and be retained in this position until the disc turns through half a revolution where the unit 70 may then move outwardly, withdrawing the pin 71 from across the slot 64 and engaging the lock arm in the other slot 74.

The inner finger 79 enters the circular slot 79a when the disc turns. This inner finger 79 engages against the inner face 80 of the part 70a and operates in a suitable radial wall slot 81 in the circular housing to assist the outer finger 78 in actuating the divider pin unit 70.

At their outer or pivoted ends, as shown in Figure 24, the arms 76 have the inturned terminal portions 82, between the opposing ends of which a loose coupling 83 is established so that upon oscillation of one of the arms movement will be imparted in the opposite direction to the other one.

Operatively coupled with one of the divider actuating arms 76 to oscillate the arm on the axis of the pivot 75, is a rock shaft 84 which, at the end remote from the arm 76 with which it is coupled, carries a crank 85 which engages in the cam groove or track 58. This groove is suitably formed so that upon rotation of the auxiliary gear wheel 54 desired oscillatory motion will be given to the rock shaft 84 to move the divider actuator fingers inwardy and outwardly in properly timed relation with the other moving parts.

Figure 18 shows the cam groove or track 58 laid out flat or in its entirety in one view and as shown in this figure the major portion of the groove is straight. This straight portion is designated a. When the crank 85 is engaged in the portion a the lock arm 72 will be disengaged from the receiving slots 74 of the housing and the twister or wheel will thus be unlocked from the housing and free to rotate. At one end this long portion of the groove extends obliquely across the periphery of the gear as at $b$ and joins a relatively long straight portion designated $c$. When the crank is engaged in this portion $c$ the arm 72 will be locked in a recess or notch 74 of the twister gear housing.

At the end of the portion $c$ the groove extends diagonally back to the opposite side of the gear as indicated at $d$ to the short straight portion $e$ which is at the side of the gear where, when the crank is engaged therein the arm 72 will be unlocked from the housing and this portion $e$ diagonals back through the portion $f$ to the opposite short straight portion $g$ upon the locked side and then this short portion $g$ extends diagonally back through the short diagonal portion $h$ to join the previously referred to longer portion $a$. The action of these portions of the cam groove will be hereinafter described.

The looper mechanism

Adjacent to each twister wheel or disc there is formed integral with the part 59b of circular housing 59, a circular housing designated 86 and having the axis of its radial center perpendicular to the axis of the twister disc housing and freely rotatable within this second circular housing is the annular looper ring 87.

The looper ring lies free for rotation in the circular housing 86 as shown in Figure 30, and in one side of the ring there are formed the gear teeth 88 as shown in Figure 31. The lower part of the housing 86 adjacent to the toothed face of the looper ring or ring gear 87 is cut out as indicated at 86a and most clearly shown in Figures 13, 14, 20 and 30, for the engagement with the ring of a driving gear, as hereinafter described.

The looper ring has formed therethrough a slot 89 which is radially directed as clearly shown in Figures 31, 32 and 33 and extending across this slot is a pivot pin 89a.

Oscillatably mounted upon the pivot pin 89a, is a wire grasping finger 90 which is adapted, when oscillated in one direction, to extend beyond the outer face of the ring as shown in Figure 32 and when oscillated in the opposite direction is designed to enter the slot 89 to secure the end 24 of the wire at a stage in the operation of the apparatus, as shown in Figures 8, 10 and 14.

The inner end of the looper finger 90 has a laterally directed tail piece 91 which carries a roller 91a, as shown in Figure 33, which is adapted to engage in a controlling cam groove.

The tail piece 91 of the looper finger is directed toward the inner wall of the housing 86 in which the looper ring is mounted or, in other words, this tail piece is directed away from the slot 61 as shown in dotted outline in Figure 14 and in full lines in Figure 15.

The inner wall face 86b of the looper ring housing 86 has formed therein the cam groove 92 in which the cam follower roller 91a engages. This cam groove or track 92 has the inwardly offset portions 92a and 92b which oscillate the finger 90 to outwardly swung position, as shown in Figure 30. When this finger is swung outwardly by the offset 92a it receives the end portion 24 of the wire from the hereinafter described gripper and when the follower enters the offset portion 92b the finger is again swung outwardly to release the end of the wire. Between these offset portions the cam track maintains the finger swung inwardly as shown in dotted outline in Figure 30, to secure the end 24 of the wire to carry it over from a first position to a second position. In addition to the fact that the cam track 92 between the two offset portions will maintain the free end of the finger in its swung in position, it will also be seen that the housing wall will maintain the finger in place except in the area opposite to the offset 92b where a sufficient clearance is provided to permit the finger to swing outwardly. Such clearance portion is designated 92c.

As shown in Figure 14 where the end 24 of the wire is held by the finger 90 at the opposite side of the housing 86, adjacent to the offset 92b of the cam groove 92, the wire is secured across the edges of the opening 89 in which the finger is pivotally mounted.

As is readily obvious from a consideration of Figures 13 to 16 and 30 and 31, the face of the wall 86b in which the cam groove 92 is formed, is in a plane parallel with the slot 61 and also the slot 62 which is formed in the top of the press box and, therefore, it will be seen that when the end of the wire 24 is taken by the looper finger from the hereinafter described gripper, such end can be readily carried over from the position in which it is shown in Figure 4 to the position in which it is shown in Figures 8 and 10. The position to which the end 24 of the wire is carried as shown in Figure 8 is in preparation for the twisting action shown in Figure 10. In both of these positions the end 24 is securely held by the looper finger.

The side of the looper ring gear housing 86 adjacent to the slot 61 is closed by the cover plate 186, which plate is of somewhat smaller diameter than the looper ring gear, as shown in Figure 4, and is secured in place by screws 187, or any other suitable means.

As shown in Figure 30 the wall 86b of the housing 86 has the opening 188 therein which leads into the adjacent portion 59b of the two-part twister disc housing and the cover plate 186 has a corresponding opening therein as indicated at 189 in Figure 34 for the extension of the twister disc into the adjacent housing part.

In the views of the mechanism forming Figures 6 and 8 the twister gear housing part 59a and the adjacent plate part 60b have been removed and also the cover plate 186 has been removed to show the looper ring gear and cam track structure and in Figure 10 the cover plate 186 is shown in position but the housing part 59a and the plate part 60b are removed.

Operatively coupled with the gear teeth 88 of the looper disc, is the gear 93 which is carried by the rotatably supported shaft 94 and which shaft also has mounted thereon the mutilated small timer gear 95 which is positioned for intermittent toothed connection or engagement with the teeth of the auxiliary timer gear 54.

The wire holder or gripper

Mounted upon the shaft 94 of the looper mechanism is a gear pinion which is designated 96 and this gear meshes with a crank gear 97, as shown in Figure 2. Pivotally attached to the crank gear 97 eccentrically thereof as indicated at 98, in Figure 20, is a coupling rod 99 which connects at its other end with the crank 100 which is formed upon the end of the gripper rock shaft 101, which extends rearwardly and terminates adjacent to the forward edge of the looper disc 87. The rear end portion of the rock shaft 101 pases through a casting 102 which provides a bearing support for the shaft and a cam track as hereinafter stated.

At the rear end of the shaft 101 is a wire gripper and cutter unit which is generally designated 103. One part of this unit comprises the relatively long arm 104 which is secured to the adjacent end of the shaft 101 upon the side of the casting 102 nearest to the forward side of the twister wheel housing part 59a. This arm 104 is of substantial length and terminates in the wire receiving jaw portion 104a which, when the gripper is open to receive a new end portion of wire from the needle, lies across the slot 62 as shown in Figures 14 and 20. In this open position of the wire gripper and cutter the arm is swung down as shown and when the arm is swung upwardly in its wire gripping position, as shown in Figures 13 and 21, the arm will be upon the side of the plane of the slots 61 and 62 opposite from the looper ring.

Pivotally coupled to the arm 104, at 105, is the movable or active jaw 106. As shown in Figure 22, the arm 104 is provided with a slot 104b and the movable jaw 106 has a portion 106a of reduced thickness to extend through the slot 104b and the pivot 105 is passed through these two interconnected parts of the gripper.

The jaw 106 co-acts with the wire receiving jaw portion 104a of the arm 104 to grip a wire and there is secured to one side face of the movable jaw 106 or the side of the jaw which is nearest to the looper ring, a cutting knife 107 which co-acts with the adjacent part of the arm 104 to sever the newly laid in wire portion 24' after the tying of a bale is completed and the parts are in order for the pressing and tying of a new bale.

The end portion of the movable jaw 106 which is upon the opposite side of the arm 104 from the head of the jaw 106, is formed to provide the laterally extending finger 108 which terminates in the cam follower member 108a. This finger 108 is directed toward the adjacent side of the casting 102 and the follower portion 108a is slidably engaged in the cam slot 109 which is formed in the adjacent face of the casting 102, as shown in Figure 21. As is also clearly shown in this figure, when the arm is raised to upright position and is cooperating with the movable jaw 106 to grasp or hold the end 24 of the wire, as shown in Figure 13, the follower 108a will be at the upper end of the cam slot 109 and the movable jaw head will be upon the side of the part 104a of the arm 104, remote from the plane of the slots 61 and 62. When the shaft 101 is oscillated in the proper direction to swing the arm 104 downwardly the wire receiving portion 104a of the arm 104 moves down to position across the slot 62 as shown in Figure 20 but the final position of the movable jaw 106 is vertical as shown in Figure 14.

It is also to be noted that when the wire holder or gripper is in wire gripping position as shown in Figure 13, the looper ring finger will be in the position in which it is shown in Figure 13, that is, it will be somewhat below the elevation of the secured end 24 of the wire and projecting outwardly and the cam follower 91a of the looper finger will be adjacent to the upper end of the offset portion 92a of the cam groove 92 so that upon rotation of the looper ring counter-clockwise as viewed in Figures 4, 6, 8 and 10 and also in Figure 30, the finger will quickly close. While the finger is moving up and closing the wire gripper unit 103 will be swinging down from the position in which it is shown in Figure 13 and will open at the proper moment to transfer the end of the wire to the looper finger which will close on the wire and secure it and carry it over to the position in which it is shown in Figure 14 and also in Figures 8 and 10.

Operation

In the operation of the mechanism described, when the needles 20 are in lowered position as shown in Figure 1, the twister disc or wheel is disposed so that the slot 64 thereof is directed, or has its open side directed, toward the rear end of the baler or press box and the wire gripping unit 103 is in raised position and has the free end of the baling wire secured between its jaws so that the previously referred to end portion 24 of the wire passes down through the forward end of the press box, through the eye of the needle and under the roller 42 of the tension arm 40 to the wire reel.

As the hay is introduced into the press and the plunger compacts it so as to fill up the forward end of the press box the bale causes the measuring wheel 49 to turn in the well-known manner until the desired bale size has been reached. During this process the wire will be drawn off from the reel and will pass across the rear end of the bale and lengthwise thereof upon the top and bottom sides. As the wire is pulled toward the rear from the jaws of the gripping arm it will be pulled up into the slot 64 of the twister disc and since the divider pin 71 will be in the outer or withdrawn position, as shown in Figure 24, the wire enters into the end or crotch of the slot, and is maintained in the position in which it is shown in Figure 4.

When the full bale size has been reached, the clutch 46 is actuated to start the necessary turning of the main shaft 26 to transmit motion from the main shaft gears to cause operation of the different units in the proper sequence.

At the moment of engagement of the clutch unit 46 the wire end portion 24 will be held by the upraised wire gripper in the position shown in Figure 4 and, as previously stated, the looper finger will be in the position shown in dotted outline in Figure 4 ready to take over the end of the wire as the gripper swings down across the plane of the slots 61 and 62 and releases the wire end.

The main gear 53 on shaft 26 will be in the position where the small group 55 of teeth is ready to move into engagement with gear 68 and the crank 85 which controls the shaft 84 by which oscillatory movement is transmitted to the arms 76, will be engaged approximately at the point f' in the cam slot 58 of the auxiliary gear 54, as shown in Figures 5 and 18, where the lock arm will be engaged in a slot 74. The slot 64 of the twister disc will, of course, be directed downwardly as shown in Figure 24 and as previously stated.

When the clutch is engaged and the shaft 26 starts to turn the needles start to swing upwardly, the auxiliary gears 54 start to turn and cam 58 actuates the shaft 84 to release the divider unit lock arm 72 from the housing slot 74.

The gear segment of small group of teeth 55 upon the gear 53 engages the gear 68 and effects the rotation through the shaft 67 and the gear 66, of the twister disc through one-half revolution stopping the twister disc with the slot 64 thereof directed upwardly and forwardly as it is shown in Figure 14. The secured end 24 of the wire will now lie in the bottom or crotch of the slot 64 below the line of the divider pin 71. The cam slot 58 now shifts the divider unit outwardly again to move the lock arm into the opposite slot 74 of the twister disc housing, withdrawing the divider pin from across the slot 64 and locking the twister disc against movement.

As soon as the slot 64 of the twister disc has reached the upwardly directed position where it is in the plane of the slot 61, the needle moves into the raised position shown in Figure 6, laying a portion of the wire in the slot 64 of the twister disc, the needle passing through the plate 60, through the slot 61 between the two parts 60a and 60b of the plate.

The continuously rotating auxiliary gear 54 now brings the cam slot 58 into the proper position to actuate the arms 76 for the unlocking of the divider unit or disengagement of the locking arm 76 from the housing, which action projects the divider pin 71 across the slot 64 and locks the two crossed wires in the slot 64 as shown in Figure 6. In this figure it will be understood that the wires at the point of crossing are below the pin and in the inner end of the slot, the slot being directed upwardly and the position of the cam slot 58 shows it about to actuate the crank 85 to the position shown in Figure 9 to effect the stated shifting of the divider unit 70 inwardly to extend the pin 71 across the slot 64.

The toothed or gear segment 57a now meshes with the mutilated gear 95 causing two actions to take place namely, the wire gripper starts to move from the position in which it is shown in Figure 13 over and down across the plane of the slots 61 and 62 and across the periphery of the looper ring 87, carrying with it the end of the wire 24. In this movement the jaws of the gripper open at the proper moment to give the end of the wire to the looper finger and the wire receiving jaw portion of the arm 104 stops across the slot 62 as shown in Figures 14 and 20. The second action occurring at the same time is that the looper ring starts to rotate as the gripper starts to swing down with the wire, moving the looper finger 90 upwardly toward the wire gripper from the position in which it is shown in Figure 13 and the finger takes the wire from the gripper as the jaws of the gripper open and the wire end is then secured across the slot in which the looper finger oscillates, as shown in dotted outline in Figure 14. As will be readily understood from the description hereinbefore given this closing action of the looper finger upon the wire to secure it to the periphery of the ring gear 87 is accomplished through the medium of the cam groove 92 and the follower 91a engaged therein as shown in Figure 30. As will also be readily understood the cam groove 109 effects the opening of the gripper jaw by its action upon the follower 108a.

During this action the crank 85 is engaged in the long straight portion a of the cam groove 58 so that the twister disc may be rotated at the proper moment.

After the looper finger has taken the wire it performs approximately one-half revolution and stops in the position shown in Figure 8, meanwhile, retaining its grip upon the end of the wire. This turning of the looper ring gives the wire a half twist around the divider pin. The wire gripper during this time has stopped, as previously stated, in the position shown in Figure 14.

The needle has started on its down or back swing and the wire receiving jaw portion of the gripper arm is positioned across the slot in time to have the wire drawn down across the arm as shown in Figures 8 and 14. At the same time in starting its back swing the needle bends the wire around the divider pin so that the free end of the wire is bent around the pin in one direction to form a loop and the needle carried portion of the wire is bent around the pin in the opposite direction to form a loop, as shown in Figure 8.

The gear segment portion 57a of the auxiliary gear 54 has now completed its function and is in the position shown in Figure 8, having cleared the mutilated gear 95.

The larger toothed gear portion 56 of the main gear 53 now comes into position as shown in Figure 8 to engage the mutilated gear 68 and impart, through the shaft 67 and the gear 66, a number of rapid rotations to the twister disc 63, thus twisting together two sides of each loop by the rapid rotation of the divider pin which passes through the looped ends of the wires, thus completing the joining of the two portions of the wire together as illustrated in Figure 10. The number of rotations imparted to the twister disc is regulated by the gear segment 56 to stop the disc with the slot 64 directed downwardly or in its initial position.

The wire ends have now been coupled together and the twist or tie is ready to drop down through the slot 64 as soon as the divider pin 71 is withdrawn and this withdrawing action of the divider pin now occurs through the action of the cam track 58 causing the control arms 76 to move outwardly. At the same time gear segment 57 of the auxiliary gear 54 connects with the mutilated gear 95 to cause the looper ring to start moving back to its starting position and when this occurs the cam groove 92 actuates the looper finger 90 to release the wire and thus the coupled ends are allowed to drop from the position shown in Figure 10 to the top of the bale and the looper finger is moved back to its starting position, as it is illustrated in Figure 4.

Also occurring substantially simultaneously with the preceding action, when the gear segment 57 comes into operation, is the movement of the gripper back to its elevated position as shown in Figure 13, during which action it grips the wire previously laid across the gripping end portion of the arm 104 and cuts the wire between the twist or knot and the closed jaws, thereby severing the completed knot from the new end portion which is designated 24″ and leaving this end portion securely grasped between the gripper jaws.

The needle or needles have by now returned to their normal lowered position as shown in full lines in Figure 1.

Referring again to Figure 18 in connection with Figures 4, 6, 8 and 10, at the start of operations the crank will be in the position shown at one end f' of the oblique portion f of the cam track. Here the twister disc is held against turning but upon rotation of the cam track in the direction indicated by the arrow the crank will move into the straight portion e and will be turned to release the twister disc so that the disc can be given the previously stated half turn. After this the crank will be actuated by the oblique portion d to lock the twister disc and during the period of its movement through the portion c of the cam slot the crank will be in position to maintain the twister disc locked and the divider pin withdrawn. During this time the wire will be laid in the slot by the needle. The crank pin will then be moved through the oblique portion b into the longest portion a of the cam slot 58 thus unlocking the twister disc and extending the pin in to secure the two crossed wires in the slot after which the wire end carried by the looper finger will be carried over across the pin and a portion of the wire carried by the needle will be bent across the pin in the opposite direction and the looper disc will be rotated to twist the wires. When the crank reaches the end of the slot $a$ adjacent to the oblique portion $h$ it will be actuated by the oblique portion $h$ to effect the withdrawal of the pin and the relocking of the twister disc as the crank moves to the starting end of the groove portion $g$ in which it is shown in Figure 18.

All of the preceding functions take place during one rotation of the stop clutch, the clutch becoming disengaged immediately upon the completion of such functions and the return of the needles to the lowered position as previously described.

Figures 35 to 40, inclusive, illustrate a slightly modified construction of the needle and tying mechanism wherein the initial half rotation of the twister disc is eliminated and the portion of the wire carried by the needle is inserted into the twister disc slot while the slot is directed downwardly in its initial position.

In this modified construction the twister gear housing and the looper ring housing are formed in two parts but the line of division is through the twister gear housing in a plane perpendicular to the rotary axis thereof.

The twister gear housing is generally designated 115 while the looper ring housing is generally designated 116. The looper ring within the housing 116 is indicated in dotted outline and designated 117, this ring being of the same construction or design as the ring 87 and carrying the looper finger 118 which functions in the same manner as the finger first described except that in this modification the ring turns in the opposite direction from the looper ring 87 so that the looper finger takes the wire end 224 from the gripper, here designated generally by the reference character 203, as it releases the wire in a manner previously described in connection with the preferred embodiment of the invention.

Since the twister disc does not make an initial half turn as in the first embodiment the elimination of one of the divider unit actuating arms becomes possible. Accordingly only a single divider unit actuating arm is employed, such arm being generally designated 119 and being oscillatably supported by the operating shaft 120 which passes through the bearing openings 121 of the twister disc housing as illustrated in Figure 39 where one-half only of the casting structure is illustrated.

Also the introduction of the wire from the bottom of the mechanism makes possible the elimination of the plate 60 previously described and accordingly the lowered bearing for the arm actuating shaft 120 makes possible the disposition of the crank 122 carried by the shaft 120, at the lower side of the auxiliary drive gear for engagement in the cam slot 123 which forms a part of this auxiliary gear and which corresponds to the cam slot 58 except for the slight modification necessary therein to eliminate one oscillatory movement of the divider unit actuating arm 119.

The other mechanism for actuating the looper ring, the wire gripper and the twister disc is the same as in the first described embodiment of the invention, therefore, it is believed that a description of these parts will not be necessary. However, the toothed face of the auxiliary gear 254 is reversed from the position shown in Figure 2 for the corresponding gear 54 and the mutilated gear 295 is also correspondingly changed in its position so that the desired rotation of the looper ring clockwise, as seen in Figures 35 to 37, occurs instead of counter-clockwise as in the first described form.

The upper end portion of the needle is here designated 220 and as shown in Figure 36 this end of the needle is bifurcated or provided with the two horns or furcations 221 and 222 and the portion 224' of the wire is extended across between the ends of the furcations as here illustrated so that as the needle rises one furcation will rise in front of the castings making up the housings 115 and 116 while the other furcation will be extended through the lower part of the slot 261 to thereby introduce into the upper end of the slot and into the downwardly and rearwardly directed slot of the twister disc, that portion 224' of the wire extending between the furcations of the needle, as shown in Figure 36.

When the wire is so placed in the twister disc by the needle, after the portion 224' has been placed therein, the disc, a portion of which is shown through the edge wall opening of the housing 115 and designated 263, will be given the necessary number of rotations by the gear 266, corresponding to gear 66 of the first described structure, to twist the wire in the manner shown in Figure 35 after which the cam groove 123 in the auxiliary gear 254 will function as in the first structure to effect the movement of the divider unit into locking position and withdraw the divider pin for the release of the wire.

Figures 41 to 45 illustrate still another method of carrying the free end of the wire, here designated 324 over from one side of the twister disc to the other by means of another looper mechanism from that shown in Figures 35 to 38, the other parts of the structure of these figures being retained or, in other words, use being made of the bifurcated needle for the insertion of the wire from the lower side of the twister disc.

In this modified looper mechanism shown in Figures 41 to 45 the twister disc housing is designated 215 and there is provided around the housing in a plane at one side of the needle receiving slot 361, the circular surface 123, in which is formed the cam groove or track 124.

Upon the side of the housing 115 adjacent to the cam track 124 is rotatably mounted the gear 125 which turns on the axial center of the circular track 124 and this gear has meshing therewith the gear 126 which is turned by the shaft 127 which corresponds to the shaft 94 by which, in the first described structure, the looper ring is turned.

Connected with the gear 125 is an arcuate looper arm 128 which has its free end extended across the cam groove or channel 124 and the end of this arm is provided with the angularly directed jaw 129.

Adjacent to the jaw 129, the arm 128 is provided with the slot 130 and extending through this slot and supported upon the pivot pin 131 is the oscillatable or swinging jaw 132, one end of which is angularly turned as indicated at 133 and provided with the cam groove slot follower 134 which engages in the groove 124.

As shown in Figure 41 the looper finger 132 forming one of the two jaws, is moved by the arm 128 around the circular path 123 and the follower 134 moves in the cam slot 124 to effect the opening and closing of the finger at the proper periods to take the free end of the wire from the gripper and cutter unit 303 and to release the wire at the far side of the twister housing from the gripper, in the same order followed by the mechanism in the previously described embodiments of the invention.

From the foregoing description it is believed that it will be readily apparent that there has been provided in the present invention in the several embodiments thereof, a novel mechanism for joining together automatically by twisting, tie wires such as are commonly employed in connection with the securing of baled material. While it is recognized that automatic means is at present employed for coupling together ends of tie wires by twisting, such present known means function by wrapping the end of one wire around the end of the adjacent wire in such a manner that the application of strain to the coupled ends will, if sufficiently great, cause the ends to separate because of the fact that they actually only lie in side by side relation. In the present mechanism tie is effected by first looping the portions of the wire which are to be joined together and engaging one loop through the other and then twisting the end of each portion around itself rather than around the adjacent end so that the connection is formed between the loops and no amount of strain applied to the connection will cause the same to slip and separate but will, on the other hand, only result in a tighter coupling.

Other novel features of the present invention will be recognized as residing in the means of transferring the free wire end from one holding element to the other and in the means for controlling slack in the wire during the action of the needles, and in other details of the construction.

It is believed that it will be readily apparent how the interconnecting of the loops takes place, from a consideration of the foregoing description in connection with the accompanying drawings, particularly Figures 13 and 14. As will be seen the end 24 of the wire is first held by the gripper 103 in the side of the slot 61 opposite from the looper gear 87. Consequently when the needle carries the wire portion 24' into the upwardly directed slot 64 of the twister gear as shown in Figure 6, this new portion of the wire 24' will be laid in the twister gear slot between the end 24 and the looper gear.

When the gripper unit swings across the slot and delivers the end 24 to the grasping finger of the looper gear, such end 24 of the wire will be placed across the wire portion 24' and then as the end of the needle comes back down to form the loop in the portion 24' around the pin this new loop will be drawn or formed through the loop which is formed in the end 24 by the carry over motion of the grasping finger.

Figure 46 illustrates the form of the cam track employed for controlling the operation of the wire gripping finger 118. This cam track is designated 192 and is basically the same as the cam groove or track 92 with the exception that it has but a single offset or inset portion, which is designated 192a, instead of two portions, to correspond with portions 92a and 92b of the cam track 92.

In this Figure 46 the looper finger is shown in the position which it occupies after carrying the ends 224 of the wire around the divider pin. Parts are, in this view, in position ready for the twisting together of the two portions of the wire as will be readily seen.

The normal position of the looper finger is 180 degrees removed from the position shown in Figure 46, or at the point 192b of the cam track, from where it starts its movement toward the wire held in the gripper unit 203.

In Figure 47 the cam groove which controls the actuation of the divider arm, is shown in plan. This groove, as previously pointed out, corresponds to the groove 58 shown in Figure 18 except that the sections f, e and d are replaced by the straight section 123a, because of the elimination of the first half revolution of the twister gear which allows for the elimination in the modification shown in Figures 35 to 38 inclusive, of one actuator arm.

I claim:

1. Wire tying mechanism, comprising a means for gripping an end of a portion of a wire, a twist pin supported for extension across the wire adjacent to the held end, means for placing another wire portion in crossed relation with the first portion in a plane parallel therewith and across the pin on the same side of the pin as the first portion, means for carrying the said end of the first portion around the pin to form a loop, means for carrying the second portion of wire around the pin in the opposite direction to form a loop connected through the first loop, means for turning the pin end for end to twist each of the two loops to closed condition, and means for extracting the pin from the connected closed loops.

2. Wire tying mechanism, comprising means for gripping an end of a portion of a wire, a twist pin supported for extension across said wire portion, means for carrying a second wire portion into crossed relation with the first portion in a plane parallelling the first portion, means for moving said pin in a line perpendicular to and across the wires at the crossing point of the wires, means for carrying the said end of the first portion transversely across the second portion and then around the pin to form a loop having two adjacent sides, means for bending the second wire portion around the pin in the opposite direction from the first loop to form a loop having two sides, the transverse movement of the said end of the first wire portion and the bending of the wire portions effecting the coupling together of the formed loops, means for imparting a number of end to end turns to the pin to twist together the two sides of each loop, and means for withdrawing the pin from the connected loops.

3. Wire tying mechanism, comprising a rotatably supported disc having a radial slot extending from the periphery to the radial center thereof, means at one side of the disc for holding an end of a portion of a wire extending through the slot, means for laying a second portion of wire in the slot in crossed relation with the first portion and in a plane parallel therewith, a movable locking element carried by the disc for extension across the slot at the center of the disc to secure the wires therein, means for transferring the held end of the first wire portion across to the opposite side of the slot and transversely across the second wire portion, means for forming two wire portions around the locking element in joined loops each having two adjacent sides, means for turning the disc and locking element to twist together the two adjacent sides of each loop, and means for releasing the locking element from the loops.

4. Wire tying mechanism of the character stated in claim 3, in which said locking element comprises a shiftable pin supported by and radially of the disc.

5. Wire tying mechanism, comprising two circular members rotatably supported in intersecting planes, one of said members having a radial slot extending from the periphery beyond the rotary center thereof, means adjacent to one side face of the slotted member for holding an end of a portion of a wire extending through the slot, said holding means being on the opposite side of the slot from the other circular member, a wire gripping means carried by the said other member, means for laying a second portion of wire in the slot in crossed relation with and in a plane parallel to the first portion, a twist pin carried by the slotted member for extension across the slot to retain the wires at their crossing point in the inner end of the slot, means for transferring the held end of the first wire portion across the slot to said gripping means and transversely across the second wire portion, mechanism for turning the other member to bend the first wire portion in a loop around the pin, means for bending the second wire portion in a loop around the pin, the loops having adjacent sides, mechanism for turning the slotted member to twist together the sides of each loop, and means for withdrawing the pin from the loops.

6. Wire tying mechanism, comprising a circular rotatably supported member, said member having a wire receiving slot formed radially therein and extending through the periphery to and beyond the radial center thereof, a second circular member rotatably supported in a plane perpendicular to the plane of the first circular member, the second member encircling the first member and having one side face in a plane adjacent to one side of the radial center of the first member, means for retaining the first member with the slot thereof in a wire receiving position, means at the opposite side of the slot from the second member for holding an end of a portion of wire extending through the slot, said holding means being oscillatable across the slot to a position adjacent to the periphery of the second member, means for positioning a second wire in the slot in crossed relation but in a plane parallel with the first wire, means extensible transversely of the slot for securing the crossed wires therein, a grasping element carried by the second member and adapted to extend from the periphery thereof to receive the end of the first wire from the holding means when the holding means is oscillated in one direction, said second member being rotatable to a second position to carry the received wire end around the wire retaining means, the said means for laying the second wire in the slot further functioning to loop the second wire portion around said wire retaining means in a direction opposite to that in which the said end of the first wire is carried by said grasping means, means for releasing the first circular member, means for imparting rotary motion to the first circular member, and means for shifting said wire retaining means to a position to release the wires from the slot.

7. A wire tying mechanism as stated in claim 6, in which the said wire grasping means carried by the second circular member is in the form of a finger pivotally attached to the second member to oscillate in the plane of the second member, said finger carrying a cam follower, and a fixed cam track engaged by said follower and designed to close the finger across the end of the first wire portion as it is released from the securing means and to release the wire end when the finger has been moved by the second member to a predetermined position beyond the said second position therefor.

8. Wire tying mechanism, comprising a rotatably supported circular disc member having a radial slot opening through the periphery and extending beyond the radial center thereof, the disc member having a starting position in which said slot is arranged to receive a portion of a wire, means at one side of the disc member and at one side of the slot for holding an end of the said wire portion, a member rotatable around the disc member in a plane perpendicular to the plane of rotation of the disc member and upon the opposite side of the slot from the wire holding means when the slot is in wire receiving position, a wire end grasping finger carried by the second mentioned member, said wire holding means being designed to carry the end of the wire held thereby across the slot and said finger being adapted to be moved by the second member in a direction to receive the wire from the holding means, means for laying a second wire portion in the inner end of the slot, a twist pin reciprocably mounted in the disc for movement across the inner end of the slot to retain the wires therein, said second member when moved a predetermined distance around the disc member forming the first wire portion in a loop around said pin, the said means for laying the second wire portion in the slot further being adapted to form the second wire portion in a loop around the pin in the opposite direction from the first loop, said loops being held at their opposite sides, means for rotating the disc to twist together the held opposite sides of each of the loops, and means for retracting the pin for the release of the loops.

9. In a baling press including a press box, a wire applying and tying mechanism comprising a means for supporting a reel of wire adjacent to one side of the box, means adjacent to the opposite side of the box for gripping an end of a wire extending from the reel through the box, said wire being carried by the formation of a bale in the box, around three of four sides of the bale to extend longitudinally of the box from the gripped end of the wire, a twist pin adapted to be positioned transversely of the longitudinally extending portion of the wire adjacent to the gripped end thereof, means movable transversely through the box for carrying a portion of the wire from the reel across the fourth side of the formed bale to a position transversely of the twist pin and across and in a plane parallel with the said forwardly extending portion of the wire, means for effecting the removal of the held end of the wire from the gripping means and the bending of such end around the twist pin to form a loop, said last means and said gripping means co-acting to carry the looped end of wire across the adjacent wire portion, the said means for carrying the said portion of wire through the box further functioning to loop said portion back around the pin in the opposite direction to the first mentioned loop and through the latter, means for turning the twist pin end for end to effect the twisting of said loops, and means for releasing the twist pin from said twisted loops.

10. A mechanism of the character stated in claim 9, in which said gripping means includes a pair of jaws, one of said jaws being positioned to receive a part of the wire extending from the second loop back to the reel following the formation of the second loop, means for effecting the closing of the jaws and the return of the gripping means to its initial position, and means for cutting the wire between the gripping means and the second mentioned loop.

11. In a wire applying and tying baling press, a press box, means at one side of the press box for rotatably supporting a reel of wire, a pivoted wire gripping means supported upon the opposite side of the press box from the wire reel supporting means and adapted to hold an end of a wire extending from a reel on said means through the box, the box having a wall slot extending longitudinally thereof and adjacent to the gripping means, a slotted disc member supported adjacent to the wire gripping means for rotation in a plane extending across the slot, said disc having a slot therein extending through its periphery to and beyond its radial center, means for securing the disc with the disc slot in the plane of the box slot whereby a portion of the wire held by the gripping means may be introduced into the disc slot, a wire carrier adapted to move transversely through the press box to carry a portion of wire from a supported reel through the box slot and into the disc slot, means carried by the disc adapted for movement across the disc slot to retain therein the two wire portions, means for moving the gripping means in a plane across the plane of the two slots and for releasing the wire end, means for receiving the released wire end and carrying it through the disc slot around the said retaining means in the slot to form one loop, said carrier being retractible through the box to form the adjacent wire portion in a second loop around the retaining means, said loops being interconnected by the action of said gripping means, the wire receiving means and the wire carrying means, means for rotating the disc for twisting said loops, and means for releasing the loops from the disc slot.

12. A wire tying mechanism comprising a circular housing having a radial slot, a disc rotatable in the housing and having a radial slot adapted to align with the housing slot, a pin carried by the disc for movement radially across the disc slot, means for locking the disc against rotary movement when the pin is retracted from across the slot and for unlocking the disc for rotation when the pin is projected across the slot, means for securing an end of a portion of a wire disposed in the aligned slots, means for placing a second wire portion in the aligned slots, means for projecting the pin across the slots to confine the wires in the inner end of the disc slot, mechanism for bending the wires in opposite directions around the pin in two interconnected loops, power transmitting means coupled with the disc to rotate the same to effect twisting of the wire loops, and means for retracting the pin from across the slots and from the loops.

13. Wire tying mechanism of the character stated in claim 12, in which the means for locking the disc against turning in the housing comprises an arm carried by the pin and a slot in the housing into which the arm is adapted to engage, a rock arm pivotally supported upon the housing and having operative connection with the pin for effecting desired reciprocal movement thereto, and a control cam mechanism operatively connected with the rock arm for effecting the timed actuation of such rock arm.

14. A wire tying mechanism of the character stated in claim 12, in which the means for placing the second wire portion in the aligned slots comprises a needle member movably supported for the extension of a free end portion through the slots, said pin being retracted from across the slots when the second wire portion is placed in the disc slot by the needle, cam operated means for projecting the pin across the disc slot after the two wire portions have been placed therein to confine such wire portions in the inner end of the disc slot, the needle functioning as an element of said bending mechanism for the formation of the second wire portion as a loop around the pin.

15. Wire tying mechanism, comprising a housing having a circular chamber therein and a radial slot passing through said circular chamber, a second housing integral with the first housing and lying in a plane perpendicular thereto and at one side of the slot, the second housing having a circular chamber therein, a disc member rotatably supported in the first housing and extending across said slot, the disc member having a radial slot therein which is adapted to be aligned with the first slot, a ring member lying within the chamber of the second housing and encircling the disc member, a twist pin carried by the disc member for radial movement and adapted to have a projected position and a retracted position, the pin member when in its projected position extending across the disc slot adjacent to the inner end thereof, a gripper element supported adjacent to the periphery of the annular member for oscillation transversely thereof and of said slot and having a raised position and a lowered position, said gripping member when in its raised position being upon the side of the slot opposite from the second housing, the gripper member being designed to secure an end of a wire for movement into the disc slot when the gripper member is in raised position, a wire grasping finger carried by the annular member, means for rotating the annular member, means for oscillating the gripper member to lowered position, means actuating the grasping finger to receive an end of a wire from the gripper member as the gripper member is oscillated to its lowered position, the annular member when turned through a part of a revolution while the grasping finger is holding wire, effecting the looping of the wire around said pin when the pin is projected across the slot, means for laying a portion of a second wire in the slot prior to the looping of the first wire and while the pin is retracted and for looping the second wire around the pin after the pin is projected across the slot, the transfer of the first wire from the gripper member to the grasping finger and the formation of the first loop effecting the interlocking of the first loop with the second loop, means for rotating the disc after the formation of the loops, and means for retracting the pin following the stated rotation of the disc.

16. Wire tying mechanism of the character stated in claim 15, in which said gripper member comprises a pair of jaws, said jaws being separated and one of the jaws being disposed in a plane across the slot when the gripping member is in lowered position to receive a part of the second wire portion, and means forming a part of the gripping member for severing the second wire portion between the jaw held part thereof and the second loop as the gripping member returns to raised position.

17. Wire tying mechanism of the character stated in claim 15, in which a wall of the second housing is provided with a cam slot of substantially circular outline concentric with the annular member and having offset portions, and a follower carried by the finger and engaged in said cam slot, one of said offset portions of the slot effecting the opening of the finger with respect to the annular member adjacent to the wire gripper and the second offset of the cam slot effecting the opening of the finger following the wire twisting operation for the release of the end of the first wire portion.

18. In a baling press including a relatively long press box, mechanism for effecting the placement of a wire around a bale and the tying together of adjacent ends of two portions of such wire, comprising means for rotatably supporting a reel of baling wire at one side of the press box, means supported upon the opposite side of the press box for securing a free end of wire passing from a reel on the supporting means through the press box, an arcuate needle pivotally supported upon the press box for extension therethrough from the said one side to the said other side thereof, said needle having an eye through which the wire from a supported bale passes to the said gripping means, a disc member rotatably supported in a plane extending across the press box adjacent to and spaced longitudinally of the press box from the gripping means, said disc having a radial slot therein adapted to receive a portion of a wire between the gripped end thereof and the needle eye, the formation of a bale in the press box effecting the disposition of the tie wire around three of four sides of the bale and the placement of the said portion in the disc slot, a twist pin reciprocably supported by the disc to extend across the disc slot, mechanism for effecting the oscillation of the needle transversely through the box in the plane of the disc slot to carry a second portion of wire through the box from a supported reel across the fourth side of a bale and into the disc slot in crossed relation with the first portion of wire in the slot, means for projecting the pin across the slot to confine the crossed wires therein, the needle upon retraction through the box carrying the adjacent portion of wire around the pin to form a loop, means for removing the end of the first portion of the wire from the gripping means and carrying it around the pin for the formation of a loop therein, said loops being interconnected in the process of formation, means for rotating the disc to effect the twisting of the loops by the pin, means for withdrawing the pin from the loops and from across the slot to release the loops, said gripping means being constructed and arranged to receive a portion of wire and secure the same during the return movement of the needle, and a cutting means operating to sever the wire between the gripped portion and the adjacent loop.

19. A mechanism of the character stated in claim 18, with a brake mechanism forming an operative part of the wire reel supporting means, and means operating to apply the brake mechanism at the beginning of the return movement of the needle to prevent withdrawal of wire from the reel and to draw the wire taut between the eye of the needle and the twist pin.

20. Wire tying mechanism for a baling press comprising a housing having a circular chamber and having a radial slot, a disc body rotatably supported in the chamber and having a radial slot designed to be aligned with the housing slot, a wire gripper oscillatably supported adjacent to said housing for rocking movement from a wire holding position in which it is disposed at one side of the plane of the disc and housing slots when the latter are in the same plane to an open position in which one of two jaws is disposed across the plane of the aligned slots, said gripper when in the first named position functioning to hold an end of a portion of a wire extending through the slots, a twister pin shiftably supported by the disc for radial movement transversely of the disc slot, means for introducing a portion of a wire into the aligned slots, comprising an arm having a bifurcated end and supported for oscillation in the plane of the aligned slots, one of the furcations of the arm being adapted to extend through the aligned slots, the furcations being constructed and arranged to support a wire across the ends thereof, mechanism for effecting the projection of the pin across the disc slot when the wire portions are disposed therein, to confine the wires in the inner end of the disc slot, mechanism for effecting the oscillation of the gripper from the wire holding position to a released position, mechanism for receiving an end of the wire from the gripper during the oscillation of the gripper and bending the wire end around said pin to form a loop having two adjacent sides, said bifurcated arm upon retracting movement bending into a loop around said pin the portion of wire carried between the furcations, the last mentioned loop having two adjacent side portions, power mechanism operatively coupled with said disc to effect the rotation of the disc and pin after the formation of said loops to twist together the two sides of each loop, means for effecting the release of one side of each loop after said twisting operation, and means for effecting the retraction of the pin to release the connected loops therefrom.

21. Mechanism for twisting together two ends of a tie wire passing around a bale, comprising a gripper for holding one end of the wire, a twist pin, means supporting the pin in crossed relation with the said one end of the wire, means supporting said pin for turning end for end, means for carrying the other end of the wire into a crossed relation with the pin, means for releasing the held one end of the wire and carrying the same part way around the pin in one direction to form a loop around the pin in crossed over relation with the said other end of the wire, means for carrying the other end of the wire part way around the pin in the opposite direction to form a loop around the pin interconnected with the first loop, means for actuating the pin supporting means to turn the pin end for end to twist the loops together, means for withdrawing the pin from the twisted loops, and means for releasing the ends of the wire.

JARRELL L. BARNHILL.

REFERENCES CITED

The following references are of record in the file of this patent:

UNITED STATES PATENTS

| Number | Name | Date |
| --- | --- | --- |
| 574,699 | Amanns | Jan. 5, 1897 |
| 764,318 | Towner | July 5, 1904 |
| 1,278,051 | Springer | Sept. 3, 1918 |